(12) United States Patent
Minamigata et al.

(10) Patent No.: US 8,622,427 B2
(45) Date of Patent: Jan. 7, 2014

(54) STEERING COLUMN SUPPORT APPARATUS

(75) Inventors: Takahiro Minamigata, Gunma (JP); Minao Umeda, Gunma (JP); Takeshi Fujiwara, Gunma (JP); Osamu Tatewaki, Gunma (JP); Toru Segawa, Gunma (JP); Kiyoshi Sadakata, Gunma (JP)

(73) Assignee: NSK Ltd., Tokyo (JP)

( * ) Notice: Subject to any disclaimer, the term of this patent is extended or adjusted under 35 U.S.C. 154(b) by 87 days.

(21) Appl. No.: 13/379,524

(22) PCT Filed: Oct. 17, 2011

(86) PCT No.: PCT/JP2011/073850
§ 371 (c)(1),
(2), (4) Date: Feb. 14, 2012

(87) PCT Pub. No.: WO2012/063609
PCT Pub. Date: May 18, 2012

(65) Prior Publication Data
US 2012/0187669 A1  Jul. 26, 2012

(30) Foreign Application Priority Data

Nov. 12, 2010 (JP) .................. 2010-253492
Nov. 16, 2010 (JP) .................. 2010-256136
Nov. 19, 2010 (JP) .................. 2010-258592
Nov. 26, 2010 (JP) .................. 2010-263687
Dec. 28, 2010 (JP) .................. 2010-293131

(51) Int. Cl.
*B62D 1/19* (2006.01)
(52) U.S. Cl.
USPC .............................. 280/777; 280/779; 74/493

(58) Field of Classification Search
USPC ............. 280/777, 779, 750; 74/492, 493
See application file for complete search history.

(56) References Cited

U.S. PATENT DOCUMENTS

| 7,188,867 | B2* | 3/2007 | Gatti et al. ............. 280/777 |
| 7,731,235 | B2* | 6/2010 | Klukowski ............. 280/777 |
| 2008/0012281 | A1 | 1/2008 | Cho et al. |
| 2009/0120229 | A1 | 5/2009 | Shibazaki et al. |
| 2010/0282016 | A1 | 11/2010 | Oehri et al. |

FOREIGN PATENT DOCUMENTS

| EP | 1975037 | 10/2008 |
| JP | 51119231 | 9/1976 |
| JP | 51121929 | 10/1976 |
| JP | 0169075 | 5/1989 |

(Continued)

*Primary Examiner* — Keith Frisby
(74) *Attorney, Agent, or Firm* — Katten Muchin Rosenman LLP

(57) ABSTRACT

Provided is a steering column support apparatus that simplifies tuning for stabilizing the forward displacement of the steering wheel during a secondary collision, and suppresses the absolute value and variation of the break away load without strong rubbing between the bracket 11 on the vehicle side and the bracket 33 on the column side. By forming an extending section 57 on the top plate section 55 of the bracket 33 on the column side, and a convex curved surface 58 on the top surface of the front end section of that extending section 57, a rise in contact pressure at the area of contact that occurs when the edge on the front end of the top surface of the top plate section 55 is pressed against the bottom surface of the bracket 11 on the vehicle side by a moment that is applied from the steering column 6c to the bracket 33 on the column side during a secondary collision is suppressed.

6 Claims, 33 Drawing Sheets

(56) References Cited

FOREIGN PATENT DOCUMENTS

| | | |
|---|---|---|
| JP | 20006821 | 1/2000 |
| JP | 2002356168 A * | 12/2002 |
| JP | 2003118602 | 4/2003 |
| JP | 2005219641 | 8/2005 |
| JP | 200769821 | 3/2007 |
| JP | 2008018920 | 1/2008 |
| JP | 2008100597 | 5/2008 |
| JP | 2008213544 | 9/2008 |
| JP | 2008247314 | 10/2008 |
| JP | 2009227183 | 10/2009 |
| JP | 2010089612 | 4/2010 |
| WO | 2007046436 | 4/2007 |
| WO | 2009121386 | 10/2009 |

* cited by examiner

STEERING COLUMN SUPPORT APPARATUS

TECHNICAL FIELD

The present invention relates to a steering column support apparatus that supports a steering column such that the steering column can displace in the forward direction with respect to the vehicle body while absorbing impact energy that is applied to the steering wheel from the body of the driver during a collision accident.

BACKGROUND ART

A steering apparatus for an automobile, as illustrated in FIG. 31, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. The steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that the shaft can transmit torque, and can contract along its entire length due to an impact load, so that when the steering gear unit 2 is displaced in the backward direction due to a primary collision between an automobile and another automobile, that displacement is absorbed, which prevents the steering wheel 1 from displacing in the backward direction via the steering shaft 5 and hitting the body of the driver.

In this kind of steering apparatus for an automobile, in order to protect the body of the driver, this kind of steering apparatus for an automobile requires construction that that allows the steering wheel to displace in the forward direction while absorbing impact energy during a collision accident. In other words, after the primary collision in a collision accident, a secondary collision occurs when the body of the driver collides with the steering wheel 1. In order to protect the driver by lessening the impact applied to the body of the driver during this secondary collision, construction is known (refer to JP51-121929(U), JP2005-219641(A) and JP2000-6821(A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 32 to FIG. 34 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 31) can be fastened to the portion on the rear end section of this steering shaft 5a that protrudes from the opening on the rear end of the steering column 6a. The steering column 6a and the housing 10 are supported by a flat bracket on the vehicle side (not illustrated in the figure) that is fastened to the vehicle body so that they can break away in the forward direction due to an impact load in the forward direction.

To accomplish this, a bracket 12 on the column side that is supported in the middle section of the steering column 6a and a support bracket 13 on the housing side that is supported by the housing 10 are supported with respect to the vehicle body so that they both can break away in the forward direction due to an impact load in the forward direction. These support brackets 12, 13 both comprise installation plate sections 14a, 14b at one to two locations, and cutout sections 15a, 15b are formed in these installation plate sections 14a, 14b so that they are open on the rear end edges. With these cutout sections 15a, 15b covered, sliding plates 16a, 16b are assembled in the portions of the support brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top plate section and bottom plate section that are connected by connecting plate section. Through holes for inserting bolts or studs are formed in the top and bottom plates in portions that are aligned with each other. With these sliding plates 16a, 16b mounted on the installation plate sections 14a, 14b, the through holes are aligned with the cutout sections 15a, 15b that are formed in these installation plate sections 14a, 14b.

The bracket 12 on the column side and the bracket 13 on the housing side are supported by the fastening bracket 11 on the vehicle side by screwing nuts onto bolts or studs that are inserted through the cutout sections 15a, 15b in the installation plate sections 14a, 14b and the through holes in the sliding plates 16a, 16b, and tightening the nuts. During a secondary collision, the bolts or studs come out from the cutout sections 15a, 15b together with the sliding plates 16a, 16b, which allows the steering column 6a and the housing 10 to displace in the forward direction together with the brackets 12 on the column side, the bracket 13 on the housing side and the steering wheel 1.

In the example in the figures, energy absorbing members 17 are provided between these bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

As illustrated in FIG. 34, during a secondary collision, the bolts or studs come out from the cutout sections 15 am 15b allowing the bracket 12 on the column side to displace in the forward direction from the normal state illustrated in FIG. 33, and the steering column 6a displaces in the forward direction together with the bracket 12 on the column side. When this happens, the bracket 13 on the housing side as well breaks away from the vehicle body, allowing this bracket 13 on the housing side to displace in the forward direction. As the bracket 12 on the column side displaces in the forward direction, the energy absorbing members 17 plastically deform and absorb impact energy that is transmitted to the bracket 12 on the column side via the steering shaft 5a and the steering column 6a, lessening the impact applied to the body of the driver.

In the case of the construction illustrated in FIG. 32 to FIG. 34, the bracket 12 on the column side is supported by the bracket on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 35 to FIG. 37 illustrate the construction disclosed in this document. In the case of this construction, a locking notch 18 is formed in the center section in the width direction of a bracket 11 that is fastened to and supported by the vehicle body and that does not displace in the forward direction even during a secondary collision, and this locking notch 18 is open on the edge of the front end of the bracket 11 on the vehicle side. Moreover, a bracket 12a on the column side is such that it is able to displace in the forward direction together with a steering column 6b during a secondary collision.

Furthermore, both the left and right end sections of a locking capsule 19 that is fastened to this bracket 12a on the column side is locked in the locking notch 18. In other words, locking grooves 20 that are formed on both the left and right side surfaces of the locking capsule 19 engage with the edges on the both the left and right sides of the locking notch 18. Therefore, the portions on both the left and right end sections of the locking capsule 19 that exist on the top side of the locking grooves 20 are positioned on the top side of bracket 11 on the vehicle side on both side sections of the locking notch 18. When the bracket 11 on the vehicle side and the locking capsule 19 are engaged by way of the locking grooves 20 and the edges on both sides of the locking notch 18, locking pins 22 are pressure fitted into small locking holes 21a, 21b that are formed in positions in these members 11, 20 that are aligned with each other, joining the members 11, 20 together. These locking pins 22 are made using a relatively soft material such as an aluminum alloy, synthetic resin or the like that will shear under an impact load that is applied during a secondary collision.

When an impact load is applied during a secondary collision from the steering column 6b to the locking capsule 19 by way of the bracket 12a on the column side, these locking pins 22 shear. The locking capsule 19 then comes out in the forward direction from the locking notch 18, which allows the steering column 6b to displace in the forward direction of the steering wheel 1 that is supported by this steering column 6b via the steering shaft.

In the case of the construction illustrated in FIG. 35 to FIG. 37, the engagement section between the locking capsule 19 that is fastened to the bracket 12a on the column side and the bracket 11 on the vehicle side is located at only one location in the center section in the width direction. Therefore, tuning for disengaging this engagement section and causing the steering wheel 1 to displace stably in the forward direction during a secondary collision becomes simple.

However, in the conventional construction, that shape of the bracket 11 on the vehicle side is special, so the construction of connecting and fastening this bracket 11a on the vehicle side to the vehicle body becomes complex, and the assembly height becomes high, therefore there is a problem in that design freedom of the steering apparatus is lost. Moreover, the number of parts increases, the work for processing parts, managing parts and assembling parts becomes troublesome, and the costs increase. Furthermore, the assembly height, for example, the distance from the center of the steering column 6b to the installation surface on the vehicle side becomes large, and there is a disadvantage in that performing design in order that the steering column 6b does not interfere with the knees of the driver becomes difficult. Furthermore, construction for preventing the steering column 6a from dropping excessively together with the steering wheel 1 when the locking capsule has completely broken away from the bracket 11 on the vehicle side after a secondary collision is not considered.

Furthermore, in the case of the conventional construction illustrated in FIG. 35 to FIG. 37, reducing the load (break away load) required in order for the locking capsule 19 that is fastened to the bracket 12a on the column side to break away from the locking notch 18 that is formed in the bracket 11 on the vehicle side during a secondary collision is not particularly taken into consideration. For example, the inside edges of the locking notch 18 that is formed in the bracket 11 on the vehicle side and the edges on both the left and right sides of the locking capsule 19 directly face each other. During a secondary collision, there is friction between the inside edges of the locking notch 18 and the edges on both the left and right sides of the locking capsule 19 while the locking capsule 19 comes out in the forward direction from the locking notch 18. Therefore, in order for the locking capsule 19 to come out smoothly in the forward direction from the locking notch 18 in order to lessen the impact that is applied to the body of the driver during a secondary collision, it is necessary to keep the friction force acting between the inside edges of the locking notch 18 and the edges on both the left and right sides of the locking capsule 19 low.

On the other hand, often in order to maintain necessary strength and rigidity, the bracket 11 on the vehicle side is made by punching and bending metal plate such as carbon steel plate using a press. In regards to the inside edges of the locking notch 18, fractured surfaces that occur while forming the locking notch by punching remain. The surface roughness of the fractured surfaces is large and thus friction resistance with opposing surfaces becomes large, which is disadvantageous from the aspect of trying to lower and stabilize the force required for the locking capsule 19 to come out in the forward direction from the locking notch 18 during a secondary collision.

Moreover, in regards to the locking capsule 19, in order to sufficiently maintain reliability and durability of the connecting section between the bracket 11 on the vehicle side and the bracket 12a on the column side, often the locking capsule 19 is made of a metal material such as a ferrous metal like mild steel or an aluminum alloy. By selecting the material for each part in this way, friction occurs between metals of the bracket 11 on the vehicle side and the locking capsule 19, including the friction between inside edges of the locking notch 18 and the edges on both the left and right sides of the locking capsule 19.

The friction coefficient in areas of friction between metal materials is comparatively large. Therefore, depending on the conditions of the secondary collision, in conditions where large contact pressure is applied to the area of friction between the locking capsule 19 and the locking notch 18, the load required for the locking capsule 19 to come out in the forward direction from the locking notch 18 increases a little. Moreover, when the locking capsule 19 is made of a material such as synthetic resin or a light metal alloy that is softer than the carbon steel plate of the bracket 11 on the vehicle side, there is a possibility that the inside edges of the locking notch 18, having exposed fracture surface with large surface roughness, will bite into the side surfaces of the locking capsule 19. In such a case as well, the load required for the locking capsule 19 to come out in the forward direction from the locking notch 18 increases a little. Particularly, when a diagonal force in the forward direction is applied to the locking capsule in a collision accident, large contact pressure is applied at the area of friction between the locking capsule 19 and the locking notch 18. As a result, the break away load required for the locking capsule 19 to come out in the forward direction from the locking notch 18 becomes large, and this situation in which the break away load becomes large is not desirable from the aspect of protecting the driver.

Furthermore, in the case of the construction illustrated in FIG. 31 to FIG. 34, in a tilt/telescopic steering apparatus having both a tilting mechanism for adjusting the up/down position of the steering wheel 1 and a telescopic mechanism for adjusting the forward/backward position, the impact load that is transmitted from the steering wheel 1 to the steering column 6a by way of the steering shaft 5a during a secondary collision is input to the bracket 12 on the column side by way of supported plate sections 32 of a bracket on the displacement side that is formed in part of the steering column 6a and an adjustment rod 37 that is inserted though long holes in the up/down direction in the support plate sections 34 of the bracket 12 on the column side. In other words, during a secondary collision, this adjustment rod 37 presses strongly against the inside edges on the front side of the long holes 35 in the up/down direction. As a result, a moment in the clockwise direction of FIG. 33 and FIG. 34 is suddenly applied to the bracket 12 on the column side with the adjustment rod 37 as the point where the force is applied (input point) and the connection section between the bracket 12 on the column side and the bolt that connects this to the bracket on the vehicle side as the fulcrum. Due to this kind of moment, the edge on the front end of the top surface of the bracket 12 on the column side is strongly pressed against the bottom surface of the bracket on the vehicle side. As a result, a large friction force acts in this area, and the break away load required for coming out from the bracket on the vehicle side increases and displacement becomes unstable. Such a situation is also undesirable from the aspect of protecting the driver.

The contact pressure that is applied at the area of contact between the bracket 12 on the column side and the bracket on the vehicle side becomes larger the larger this moment is, and this moment becomes larger, the larger the distance is between the connection section, which is the fulcrum, and the input section of the break away load. This input section is where the inside edges of the long holes in the up/down direction come in contact with the outer circumferential surface of the adjustment rod 37, and this contact area normally exists further below the main section of the steering column 6a. Therefore, the distance between the connecting section and the input section becomes large, the moment becomes large and the contact pressure at the area of contact becomes high, so reducing and stabilizing the breakaway load is difficult.

It is not presumed that the conventional construction illustrated in FIG. 35 to FIG. 37 is applied to a tilt/telescopic type steering apparatus, however, when this construction is applied to a tilt/telescopic type steering apparatus, similar problems occur. However, in the case of using a locking capsule 19 in which locking grooves 20 are formed on the surfaces on the left and right sides such as illustrated in FIG. 35 to FIG. 37, the bottom surface of the bracket 11 on the vehicle side and the top surface of the bracket 12a on the column side are sufficiently separated, so even though a moment such as described above is applied to the bracket 12a on the column side during a secondary collision, the top surface of the bracket 12a on the column side will not come in contact with the bottom surface of the bracket on the vehicle side.

Particularly, when the locking capsule 19 is made of a material such as a light alloy or synthetic resin that is softer than the steel plate of the bracket 11 on the vehicle side, an increase or variation in the break away load due to the situation as described above is suppressed to a certain extent. This is because, part of the locking capsule 19 that is strongly pressed against the bottom surface of the bracket 11 on the vehicle side by the moment described above plastically deforms, causing the contact surface area to expand and the contact pressure at that point to become lower, and it is difficult for this part to bite into the opposing surfaces. As a result, as the locking capsule 19 moves in the forward direction, it becomes difficult for the top surface of the bottom plate section that defines the bottom sides of the locking grooves 20 of the locking capsule 19 to bite into the bottom surface of the bracket 11 on the vehicle side, and it becomes easier to keep the absolute value of the break away load and variations in the load low.

However, even in the case where the locking capsule 19 is made of a light alloy or synthetic resin, depending on the conditions, there is a possibility that the locking capsule 19 will be affected by the moment described above and it will not always be possible to sufficiently lower the absolute value of the break away load and variations in the load. Moreover, when the locking capsule 19 is made of a ferrous alloy for the reason of maintaining strength and rigidity, due to the same cause, there is a possibility that the absolute value of the break away load or variations in the load will become large.

JP01-69075(U) discloses construction wherein a bracket is welded and fastened to the top surface of the steering column, and during a secondary collision, there is impact between the edge on the front end of this bracket and part of the edge on the rear end of the bracket on the column side. With the construction disclosed in this document, during a secondary collision, the moment applied to the bracket on the column side is kept low, and the break away load required for the bracket on the column side to come out in the forward direction from the bracket on the vehicle side is kept low. However, in the construction disclosed in JP01-69075(U), as in the construction illustrated in FIG. 32 to FIG. 34, the bracket on the column side is supported at two locations on the left and right by the bracket on the vehicle side, so performing tuning in order to stabilize forward displacement of the steering wheel 1 requires time and trouble. Moreover, this construction does not make it possible to prevent the steering wheel 1 from dropping excessively after a secondary collision.

Of the related literature disclosing technology related to a steering column support apparatus, JP2000-6821(A) discloses construction wherein, in order to lessen the impact applied to the body of the driver that collides with the steering wheel during a secondary collision, an energy absorbing member that plastically deforms as the steering wheel and steering column displace in the forward direction is used. Moreover, in JP2007-69821(A) and JP2008-100597(A), construction is disclosed wherein, in order to increase the holding force for keeping the steering wheel in an adjusted position, a plurality of overlapping friction plates are used to increase the friction surface area. However, none of these documents discloses technology for keeping the load required for the locking capsule, which is supported by the steering column, to come out in the forward direction from the locking notch, which is formed in the bracket on the vehicle side, low.

RELATED LITERATURE

Patent Literature

| [Patent Literature 1] | JP51-121929(U) |
| [Patent Literature 2] | JP2005-219641(A) |
| [Patent Literature 3] | JP2000-6821(A) |
| [Patent Literature 4] | JP2007-69821(A) |
| [Patent Literature 5] | JP2008-100597(A) |
| [Patent Literature 6] | JP01-69075(U) |

SUMMARY OF THE INVENTION

Problem to be Solved by the Invention

In consideration of the situation described above, the object of the present invention is to provide construction of a steering wheel support apparatus that simplifies tuning for stabilizing forward displacement of the steering wheel during a secondary collision, keeps the absolute value of the break away load and variation in the load low in order that there is no strong rubbing between the bottom surface of the bracket on the vehicle side and the top surface of the bracket on the column side or the locking capsule, as well as increases the moment rigidity of the connecting section between the locking capsule and the bracket on the column side, and as necessary, prevents the steering wheel from dropping excessively after a secondary collision.

Means for Solving the Problems

The steering column support apparatus of the present invention comprises: a bracket on the vehicle side having a locking hole that extends in the axial direction of a steering column and that is located in the center section in the width direction of the bracket, this bracket on the vehicle side being supported by and fastened to the vehicle so as not to displace in the forward direction during a secondary collision;

a bracket on the column side that is supported by the steering column; and a locking capsule that is fastened to the bracket on the column side, and in this fastened state, comprises a locked section, both end sections thereof being locked inside the locking hole, and a top side section that is formed on the top side of the locked section and having a width dimension that is greater than the maximum width dimension of of the locking hole, and that is provided with a flange section which is located on the top side of the portion of the bracket on the vehicle side on both sides of the locking hole.

By combining the locking capsule and the bracket on the vehicle side when the portion of the bracket on the vehicle side on both sides of the locking hole is held between the bottom surface of the flange section of the locking capsule and the top surface of an underneath support plate that is located below the flange section, the bracket on the column side is supported by the bracket on the vehicle side so as to be able to break away in the forward direction due to an impact load that is applied during a secondary collision.

Particularly, in the steering column support apparatus of the present invention, when the front edge of the underneath support plate is pressed against the bottom surface of the bracket on the vehicle side due to a moment that is applied from the steering column to the bracket on the column side during a secondary collision, there is means for suppressing a rise in contact pressure that increases at the area of contact between the front end on this top surface and the bottom surface of the bracket on the vehicle side.

A locking capsule having a lower half section and an upper half section, with the lower half section being the locked section, and the upper half section being the top side section, is used as the locking capsule. Together with the bottom surface of the locked section (lower half section) of the locking capsule coming in contact with the top surface of the top plate section of the bracket on the column side, the portion of the bracket on the vehicle side on both sides of the locking hole is held between the bottom surface of the flange section and the top surface of the top plate section. In other words, the portion of the top plate section of the bracket on the column side that is underneath the flange section corresponds to the underneath support plate section.

An inclined surface that is formed on the portion near the front end on the top surface of the underneath support plate and that is inclined in a direction downward going toward the front edge of the underneath support plate section, or an extending section that is formed on the front end section of the underneath support plate section and protrudes further toward the front than the edge on the front end of the flange section can be used as the means for suppressing a rise in contact pressure.

In the form that employs an inclined surface, the inclined surface can preferably be a convex curved surface having an arc shaped cross section (partial cylindrical surface). More preferably, construction is used where the arc that expresses the cross-sectional shape of the convex curved section and a straight line that expresses the cross-sectional shape of the portion on the top surface of the underneath support plate section from the middle section to the portion near the base end are connected smoothly, or in other words, this straight line is connected in the tangential direction of the arc.

The two forms above can be combined. In other words, in a form that employs an extending section, an inclined surface that is inclined in a direction downward going toward the edge on the front end of the extending section is formed on the portion near the front end on the top surface of the extending section.

In the present invention, preferably a low-friction material layer made of a material that is different from the metal of the underneath support plate and bracket on the vehicle side, is provided at the area of contact between the top surface of the underneath support plate and the bottom surface of the bracket on the vehicle side so as to reduce the coefficient of friction at the area of contact.

Furthermore, in the present invention, preferably the length in the forward/backward direction of the locking hole is longer than the length in the same direction of the locking capsule. More specifically, the length in the forward/backward direction of the locking hole is long enough that even when the locking capsule has displaced in the forward direction, at least part of the locking capsule is located on the top side of the front end section of the bracket on the vehicle side, making it possible to prevent the locking capsule from dropping down.

Moreover, preferably, at least the edges on the left and right sides of the rear end section of the locking hole are shaped so as to incline toward each other going toward the rear.

In another form of the steering column support apparatus of the present invention, alternatively or additionally, the following construction can be employed as a way of keeping the absolute value and variation of the break away load low. In other words, in this form, in construction in which the bracket on the column side comprises a pair of left and right support plate sections and a top plate section that connects the edges on the top ends of these support plate sections, the steering column is supported and the locking capsule is supported by and fastened to the top surface of the top plate section, by holding the middle section of the steering column between these support plate sections, and further, by applying a force by a rod shaped member, which is located further below than the steering column, in a direction that reduces the space between the support plate sections, a pair of protruding pieces are fastened to a portion of the middle section of the steering column on the rear side of the pair of left and right support plate sections of the bracket on the column side so as to protrude from the surfaces on the left and right sides of the steering column toward the left and right sides, and by causing the edges on the front sides of these protruding pieces to face the edges on the rear sides of the support plate sections at portions located above the rod shaped member, the impact load that is transmitted from the steering column to the bracket on the column side during a secondary collision is transmitted by way of the area of contact between the front edges of the protruding pieces and the rear edges of the support plate sections without going through the rod shaped member.

Preferably, the height positions of the protruding pieces are the same, and the positions where these protruding pieces are installed are two positions that are located on opposite sides in the radial direction of the steering column or higher than that.

Preferably the steering column is die cast using a light metal alloy, and this steering column is held between the support plate sections so that the position of the steering column can be adjusted with respect to these support plate sections, and the steering column is formed such that it is integrated with the protruding pieces.

In yet another form of the steering column support apparatus of the present invention, alternatively or additionally, a sliding layer made of a low friction material is provided in at least one side in the width direction of the engagement section between the portion on both sides in width direction of the locking capsule and the portion of the bracket on the vehicle side that is located on both sides in the width direction of the locking hole.

The sliding layer can be formed by using a sliding plate that is separate from the bracket on the vehicle side and the locking capsule. In this case, this sliding plate comprises a flat installation plate section that is placed on the portion of the bracket on the vehicle side that surrounds the locking hole, and a hanging plate section that is formed by bending downward from the inside edge of the installation plate section, and this hanging plate section fits inside the locking hole and covers at least the inside edges on the left and right sides of the locking hole, and the installation plate section is held between the bottom surface of the flange section of the locking capsule and the top surface of the bracket on the vehicle side in the portion that surrounds the locking hole.

In this construction, preferably there is a bottom plate section that is bent from the edge on the bottom end of the hanging plate section in the same direction as the installation plate section, and the portion of the bracket on the vehicle side that surrounds the locking hole is held between the top surface of this bottom plate section and the bottom surface of the installation plate section.

In the installation plate section of the sliding plate, it is possible to form a plurality of small through holes in portions that are aligned with the small through holes that are formed in the flange section of the locking capsule, and with the installation plate section held between the flange section and the bracket on the vehicle side, connecting pins can be formed to span between the small through holes of the locking capsule and small through holes or small notch sections that are formed in the bracket on the vehicle side.

In even yet another form, preferably the connecting strength of the locking capsule and the bracket on the vehicle side with respect to an impact load is asymmetrical on the left and right of the steering column. More specifically, one of the methods below is employed.

(1) The number of connecting pins on the left and right differs from each other.

(2) The diameters of the connecting pins on the left and right differ from each other.

(3) The position where the bracket on the column side is connected and fastened to the locking capsule is shifted to either direction in the width direction.

(4) Of the left and right inside edges of the locking hole, one of the inside edges is parallel with the steering column, and the other inside edge is inclined in a direction away from the one inside edge going in toward the front.

(5) Of the portion of the top surface of bottom surface of the bracket on the vehicle side that comes in contact with the flange section of the locking capsule, a sliding layer made of a low-friction material is provided only on the portion on one side in the width direction of the locking hole.

In the steering column support apparatus of the present invention, it is possible to alternatively use a member having the construction below for the bracket on the column side. In other words, in this alternative form, a pair of left and right bracket elements is each formed by bending metal plate. Each bracket element comprises an installation plate section that is formed on the top end section, an inclined plate section that is bent from the inside edge of the installation plate section to the outside in the width direction such that the crossing angle with the installation plate section is an acute angle, and is inclined in a downward direction toward the outside in the width direction, and a support plate section that hangs down from the edge of the bottom end of the inclined plate section, and the pair of support plate sections are for holding and supporting the portion fastened to the steering column from both the left and right sides. These bracket elements are arranged so that the support plate sections are parallel with each other, and a plurality of locations in the forward/backward direction are fastened to the locking capsule by rod shaped members such as bolts and nuts, rivets or the like.

Effect of the Invention

The steering column support apparatus of the present invention simplifies tuning for stabilizing the forward displacement of the steering wheel during a secondary collision, and suppresses the absolute value and variation of the break away load without strong rubbing between the bottom surface of the bracket on the vehicle side and the top surface of the bracket on the column side. Moreover, as necessary, the steering column support apparatus can prevent the steering wheel from dropping excessively after a secondary collision.

BRIEF DESCRIPTION OF THE DRAWINGS

FIGS. 27A to 27C are top views of the locking capsule, and FIGS. 27D and 27E are top views of the bracket on the vehicle side.

BEST MODES FOR CARRYING OUT THE INVENTION

First Example of First Embodiment

Figure 31:
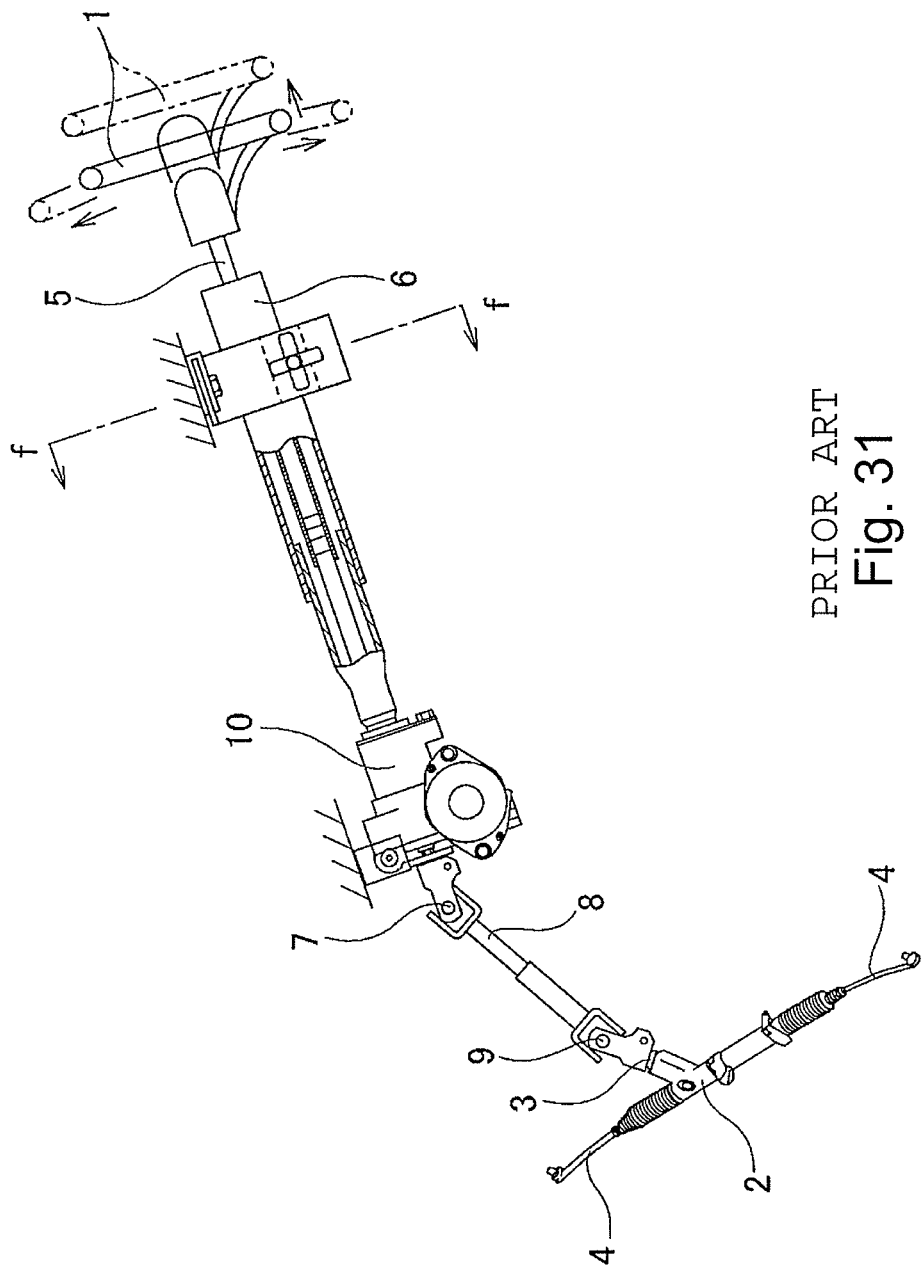
FIG. 31 is a partial cross-sectional view illustrating an example of a conventionally known steering apparatus.
Figure 32:
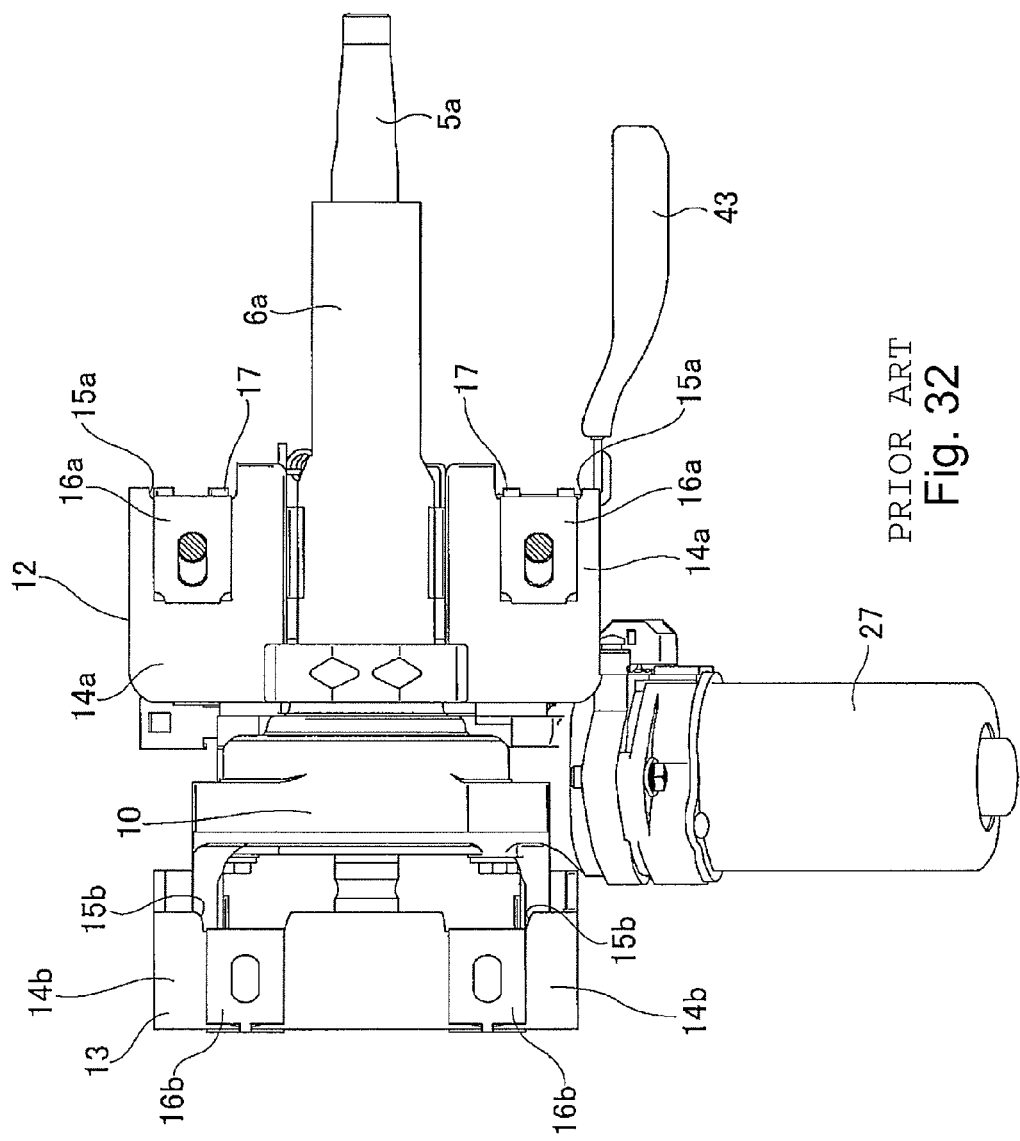
FIG. 32 is a top view of an example of a conventional steering column support apparatus, and illustrates the normal state.
Figure 33:
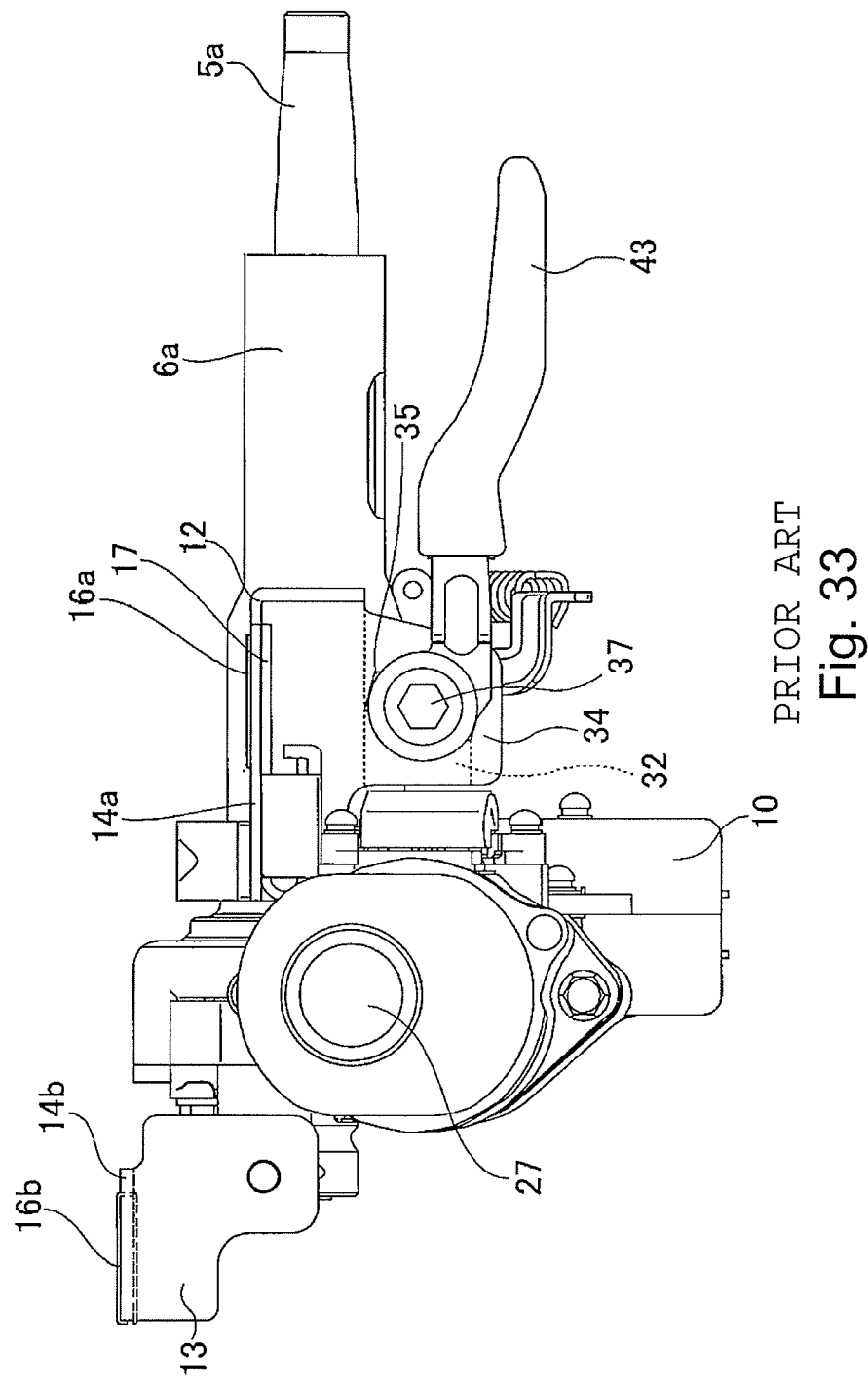
FIG. 33 is a side view of the same state of the apparatus illustrated in FIG. 32.
Figure 34:
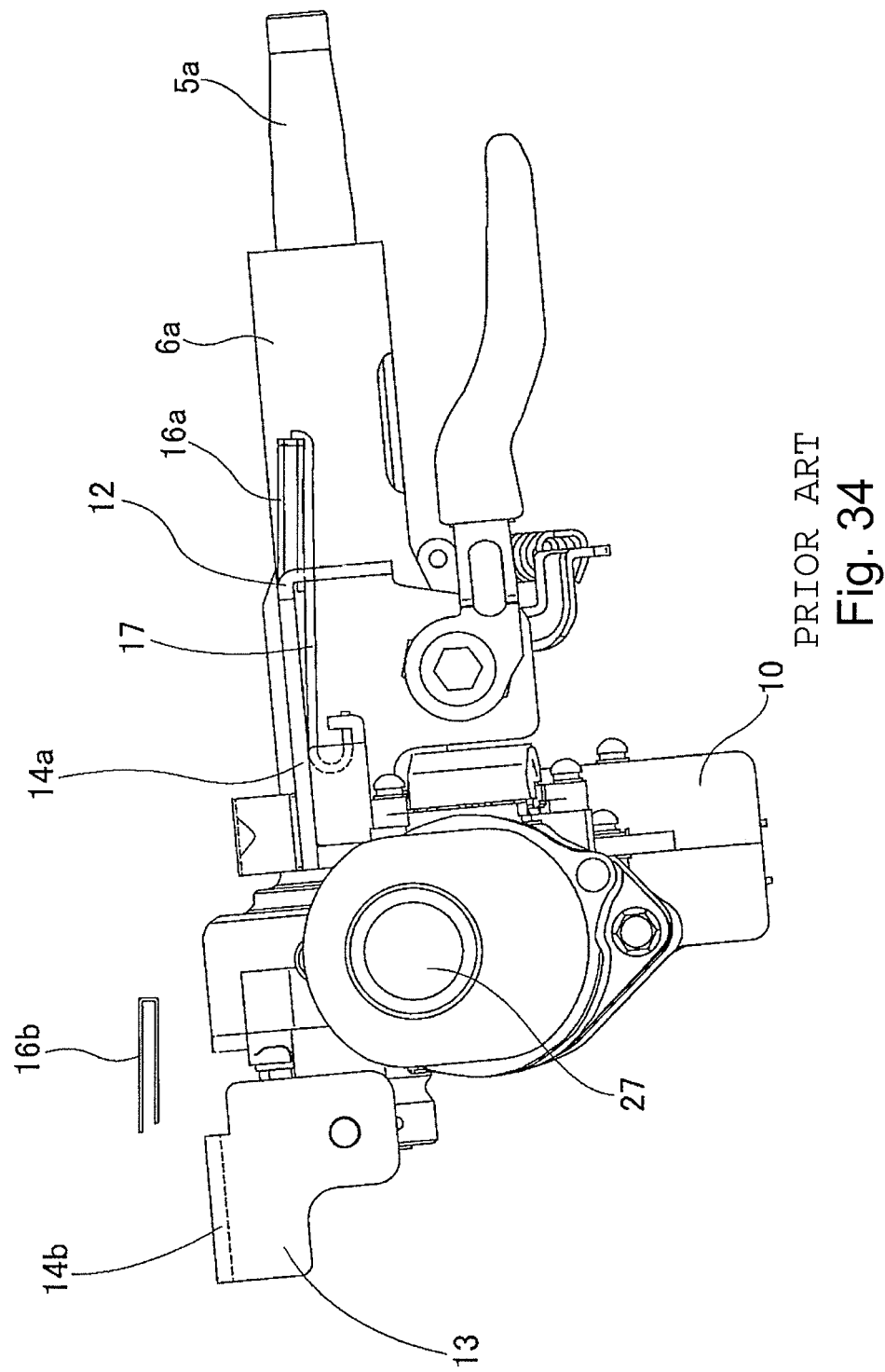
FIG. 34 is side view of an example of a conventional steering column support apparatus, and illustrates the state wherein the steering column as displaced in the forward direction due to a secondary collision.

FIG. 1 to FIG. 7 illustrate a first embodiment of the present invention. This embodiment illustrates the case of applying the present invention to a tilting and telescopic type steering apparatus that comprises both a tilting mechanism for adjusting the up/down position of the steering wheel 1 and a telescopic mechanism for adjusting the forward/backward position of the steering wheel 1 (see FIG. 31).

In order to construct a telescopic mechanism, a telescopic shaped steering column 6c that can expand or contract along the entire length by fitting the rear section of an inner column 23 on the front side inside the front section of an outer column 24 on the rear side is used. A steering shaft 5b is supported in the inner diameter side of this steering column 6c such that it can rotate freely, however, this steering shaft 5b as well is constructed such that by a male spline section that is formed on the rear section of a circular rod shaped inner shaft that is located on the front side engaging with a female spline section that is formed on the front section of a cylindrical shaped outer shaft 25 that is located on the rear side, the steering shaft 5b can transmit torque as well as expand and contract. With the rear end section of the outer shaft 25 protruding further toward the rear than the opening on the rear end of the outer column 24, the outer shaft 25 is supported on the inner diameter side of the outer column 24 by a bearing such as a single-row deep groove ball bearing 26 or the like that is capable of supporting both a radial load and thrust load such that only the rotation is possible. A steering wheel 1 is supported by and fastened to the rear end section of the outer shaft 25. When adjusting the forward/backward position of this steering wheel 1, the outer shaft 25 and the outer column 24 displace in the forward or backward direction, and the steering shaft 5b and steering column 6c expand or contract.

A housing 10a for housing a reduction gear and the like of an electric power steering apparatus is connected and fastened to the front end section of the inner column 23 of this steering column 6c. An electric motor 27, which is the auxiliary power source for the electric power steering apparatus, and a controller 28 for controlling the flow of electricity to this electric motor 27 are fastened to and supported by the top surface of the housing 10a. In order to construct the tilting mechanism, the housing 10a is supported by the vehicle body such that it can swivel around a horizontal shaft. In order for this, a support cylinder 29 is provided in the left/right direction on the upper front end of the housing 10a, and the front end section of the steering column 6c is supported by the vehicle body by a horizontal shaft such as a bolt that is inserted through a center hole 30 in the support cylinder 29 such that the rear section of this steering column 6c can swivel in the raising or lowering direction.

Figure 17:
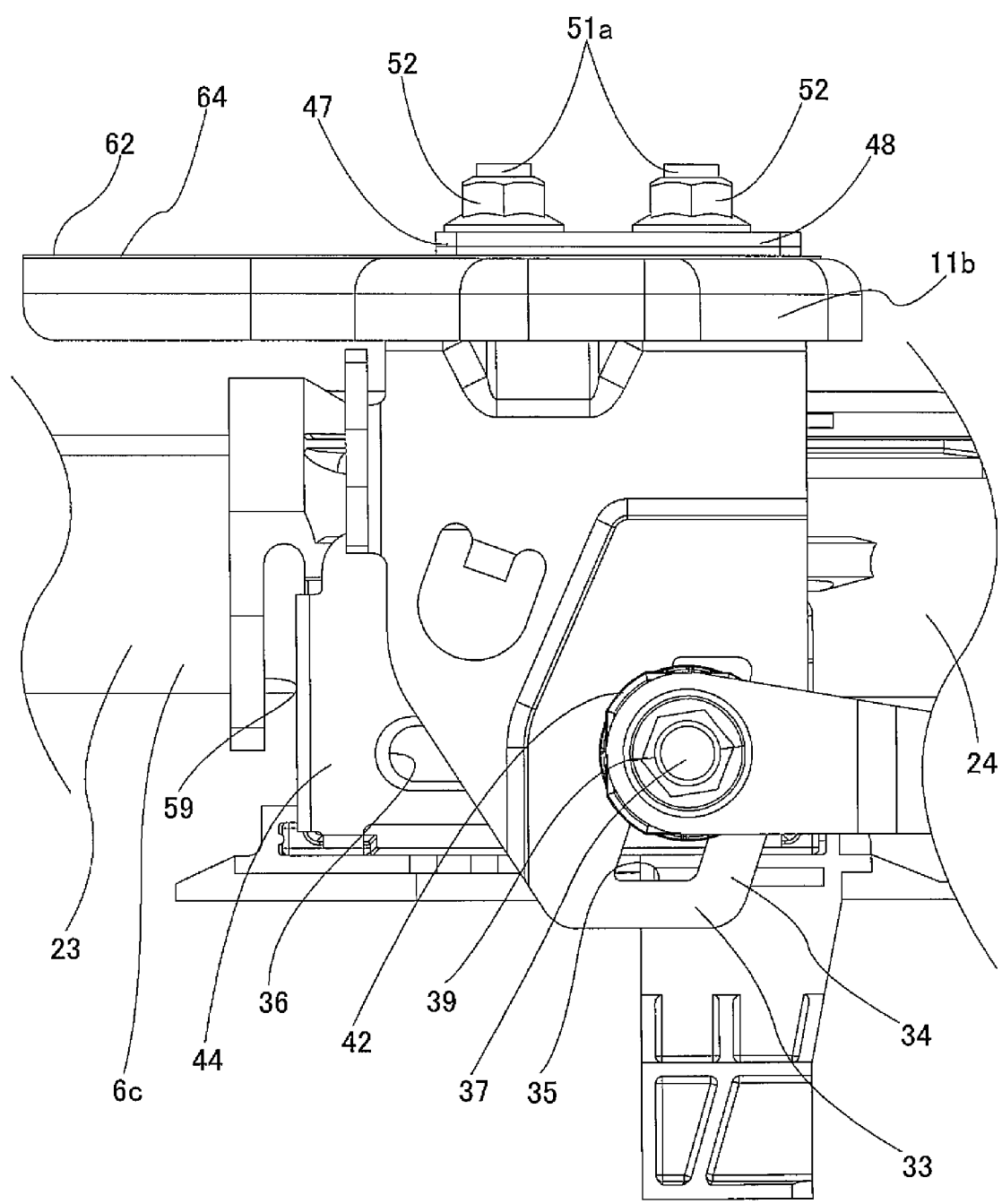
FIG. 17 is a side view illustrating the state in FIG. 16 as seen from the side.
Figure 18:
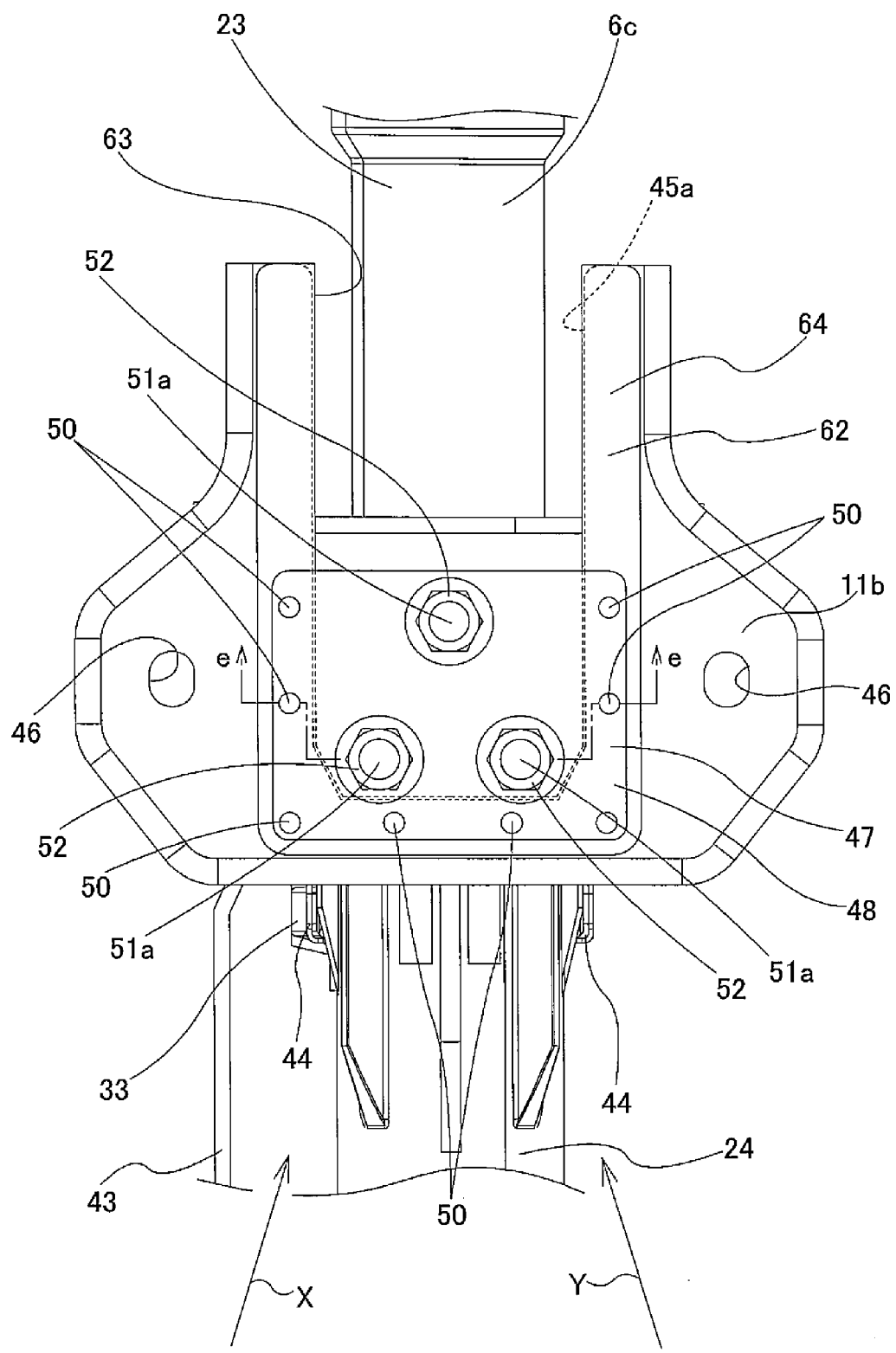
FIG. 18 is a top view illustrating the state in FIG. 16 as seen from above.
Figure 19:
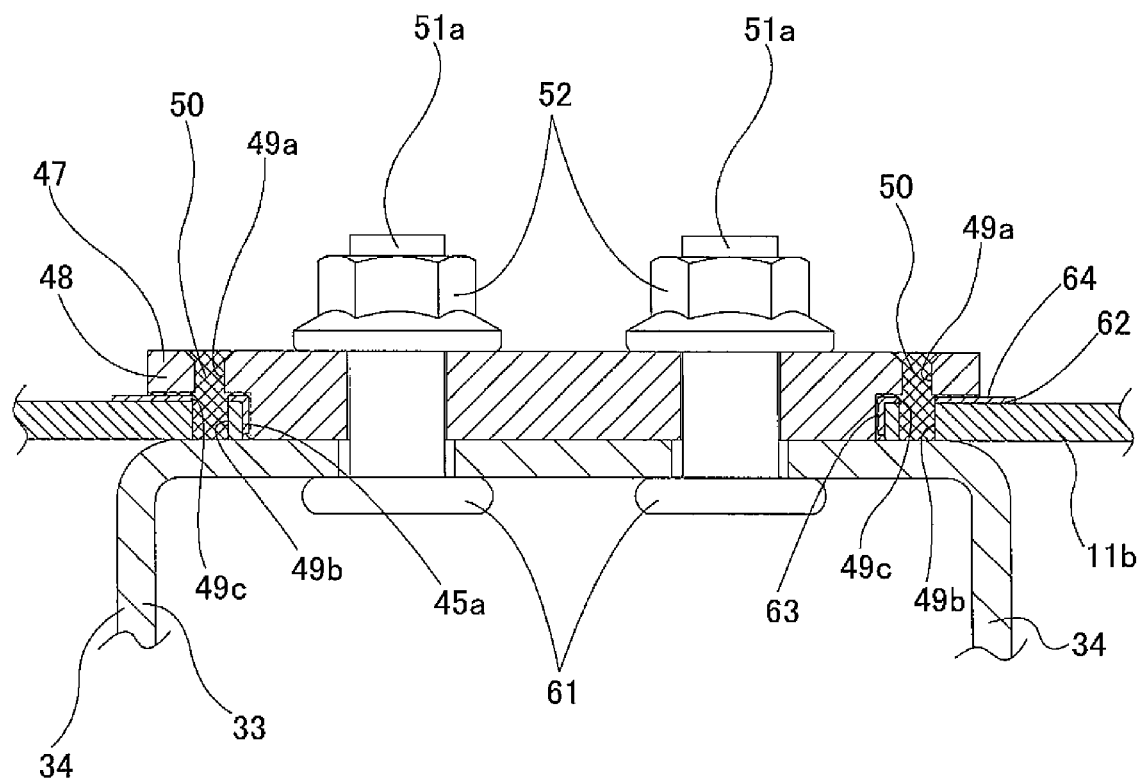
FIG. 19 is an enlarged cross-sectional view of section e-e in FIG. 18.
Figure 20:
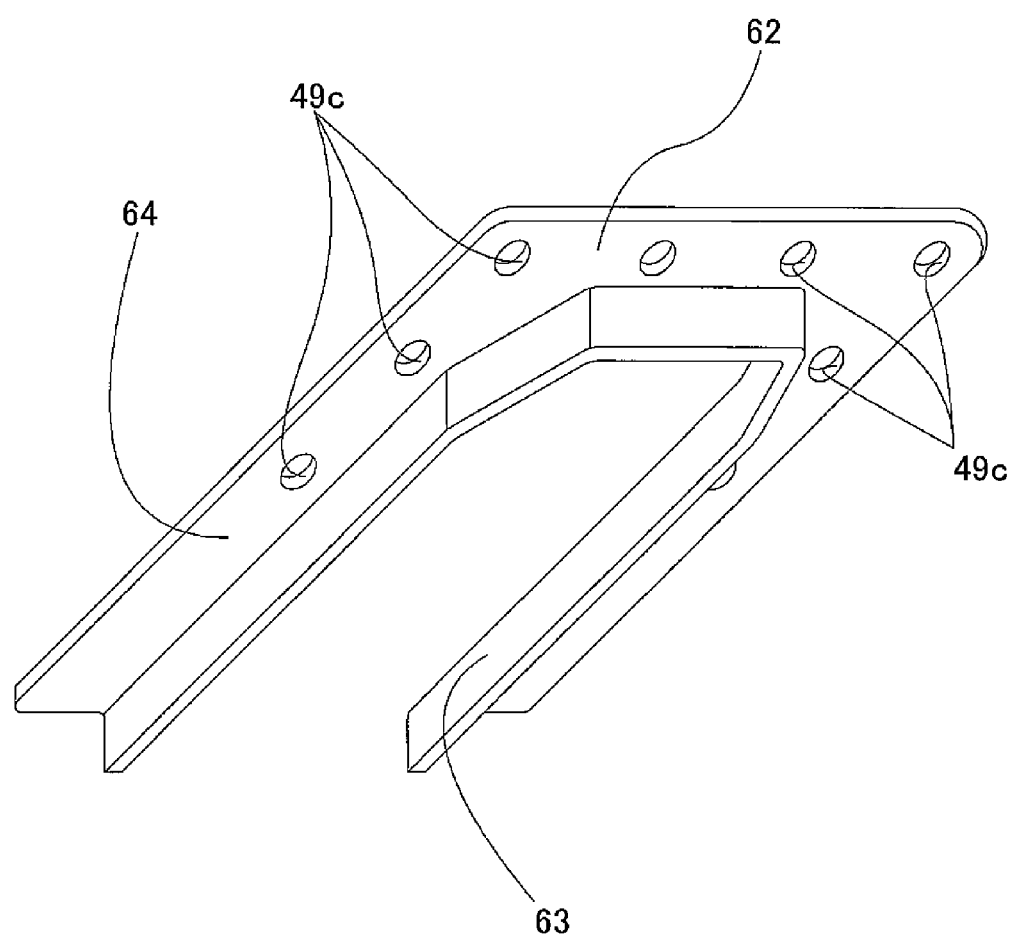
FIG. 20 is a perspective view of a sliding plate that is used in the first example of the third embodiment of the present invention, and illustrates the state as seen from the lower rear after the plate has been removed.

The inner diameter of the front half of the outer column 24 of the middle section or rear section of the steering column 6c can expand or contract elastically. In order for this, a slit 31 is formed in the axial direction on the bottom surface of the outer column 24. The front end section of this slit 31 opens up to a through hole 59 in the circumferential direction (see FIG. 17) that is formed on the edge of the front end of the outer column 24 or in the portion near the front end section of the outer column 24 except the top end section. A pair of thick plate-shaped supported plate sections 32 is located in the portion between both sides in the width direction of the slit 31. These supported plate sections 32 displace together with the outer column 24 when adjusting the position of the steering wheel 1, and function as support brackets on the displacement side.

In the case of this example, the supported plate sections 32 are supported by a bracket 33 on the column side such that adjustment of the up/down position and forward/backward position is possible. This bracket 33 on the column side is normally supported by the vehicle body, however, during a collision accident, breaks away in the forward direction due to the impact of a secondary collision, which allows displacement in the forward direction of the outer column 24. In order for this, the bracket 33 on the column side is supported by a bracket 11a on the vehicle side such that it can break away in the forward direction due to an impact load that is applied during a secondary collision.

The adjustment section of the tilting mechanism and telescopic mechanism is constructed by firmly holding the supported plate sections 32 by a pair of left and right support plate sections 34 of the bracket 33 on the column side. Long holes 35 in the up/down direction having a partial arc shape that are centered around the horizontal shaft that supports the support cylinder 29 with respect to the vehicle body are formed in these support plate sections 34, and long holes 36 in the forward/backward direction that are long in the axial direction of the outer column 24 are formed in the supported plate sections 32. An adjustment rod 37 is inserted through these long holes 35, 36. A head section 38 that is located on the base end section (right end section in FIG. 2) of this adjustment rod 37 engages with the long hole 35 in the up/down direction that is formed in one of the support plate sections 34 (right support plate section in FIG. 2) to prevent rotation, and only allows displacement along this long hole 35 in the up/down direction. On the other hand, a cam apparatus 42 having a driving cam 40 and a driven cam 41 is provided between the nut 39 that is screwed onto the tip end section (left end section in FIG. 2) of the adjustment rod 37 and the outside surface of the other support plate section 34 (left support plate section in FIG. 2). Of these cams, the driving cam 40 can be rotated and driven by an adjustment lever 43.

When adjusting the position of the steering wheel 1, the driving cam 40 is rotated and driven by rotating the adjustment lever 43 in a specified direction (downward), shortening the dimension in the axial direction of the cam apparatus 42. This widens the space between the inside opposing surfaces of the driven cam 41 and the head section 38, and releases the holding force that the support plate sections 34 on both sides apply to the supported plate sections 32. At the same time, the inner diameter of the portion on the front section of the outer column 24 in which the rear section of the inner column 23 is fitted elastically expands, which lowers the contact pressure that acts in the area of contact between the inner circumferential surface on the front section of the outer column 24 and the outer circumferential surface on the rear section of the inner column 23. In this state, the up/down position and the forward/backward position of the steering wheel 1 can be adjusted within the range in which the adjustment rod 37 can be displaced between the long holes 35 in the up/down direction and the long holes 36 in the forward/backward direction.

After the steering wheel 1 has been moved to a desired position, the dimension in the axial direction of the cam apparatus 42 is expanded by rotating the adjustment lever 43 in the opposite direction (upward) of the specified direction above. As a result, the space between opposing inside surfaces of the driven cam 41 and the head section 38 is shortened, and the supported plate sections 32 are held firmly on both sides by the support plate sections 34. At the same time, the inner diameter of the portion on the front section of the outer column 24 in which the rear section of the inner column 23 is fitted elastically contracts, and the contact pressure acting at the area of contact between the inner circumferential surface of the front section of the outer column 24 and the outer circumferential surface of the rear section of the inner column 23 increases. In this state, the steering wheel 1 is held in the adjusted up/down and forward/backward positions.

In this embodiment, in order to increase the supporting force for holding the steering wheel 1 in the adjusted position, friction plate units 44 are held between the inside surfaces of the support plate sections 34 and the outside surfaces of the supported plate sections 32. These friction plate units 44 are formed by alternately overlapping one or a plurality of first friction plates having long holes that are aligned with the long holes 35 in the up/down direction, and one or a plurality of second friction plates having long holes that are aligned with the long holes 36 in the forward/backward direction. The detailed construction and function of this kind of friction plate unit 47 is known (refer to JP2007-69821(A) and JP2008-100597(A)), and is not related to the gist of the present invention, so a detailed drawing and explanation are omitted.

Furthermore, the bracket 33 on the column side breaks away in the forward direction with respect to the bracket 11a on the vehicle side due to the impact load of a secondary collision, however, is supported so that it cannot drop downward even as the secondary collision advances. The bracket 11a on the vehicle side is fastened to and supported by the vehicle body and does not displace in the forward direction during a secondary collision, and this bracket is formed by the punching and bending of metal plate, such as steel plate, having sufficient strength and rigidity. The bracket 11a on the vehicle side is a flat plate, however, the rigidity is improved by bending the edges on both sides and the edges on the front and rear downward. A locking hole (locking notch) 45 that extends in the axial direction of the steering column 6c and that is open on the edge of the front end is formed in the center section in the width direction of the bracket 11a on the vehicle side, and a pair of installation holes 46 is formed in the rear section of the bracket 11a on the vehicle side such that the installation holes 46 are on both the left and right sides of the locking hole 45. The locking hole 45 is covered by a locking capsule 47, and is formed so as to extend near the rear end section of the bracket 11a on the vehicle side. This bracket 11a on the vehicle side is supported by and fastened to the vehicle body by bolts or studs that are inserted through the installation holes 46. In this example, the locking hole 45 is formed as a notch that is open on the front edge, however, the shape of the locking hole 45 is not limited to this, and construction is also possible in which the locking hole is formed as a closed hole that extends in the axial direction of the steering column being closed on the front edge, and that is capable of preventing the locking capsule 47 from dropping from the bracket 11a on the vehicle side.

Figure 1:
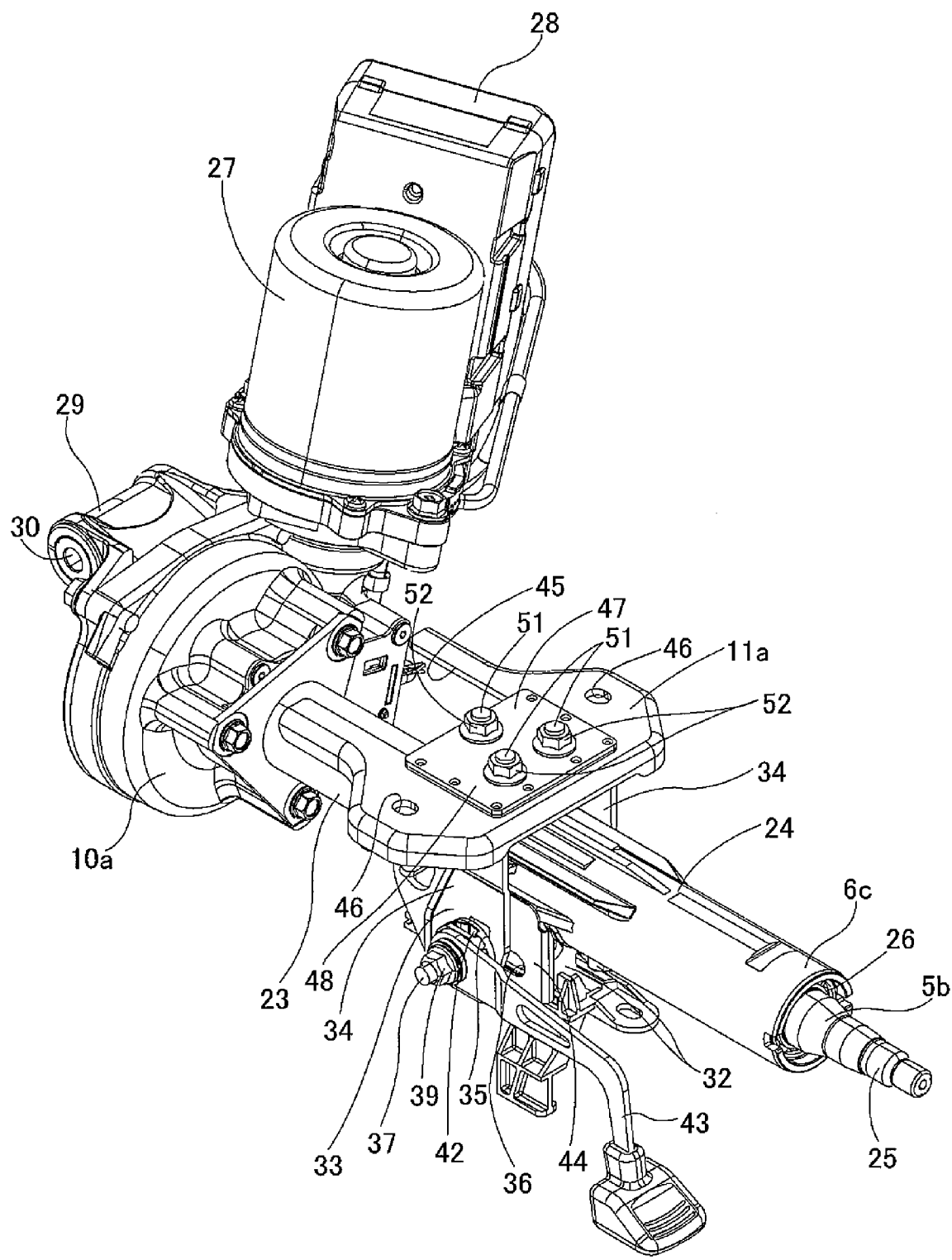
FIG. 1 is a perspective view illustrating a first example of a first embodiment of the present invention, and illustrates the state as seen from the upper rear.
Figure 2:
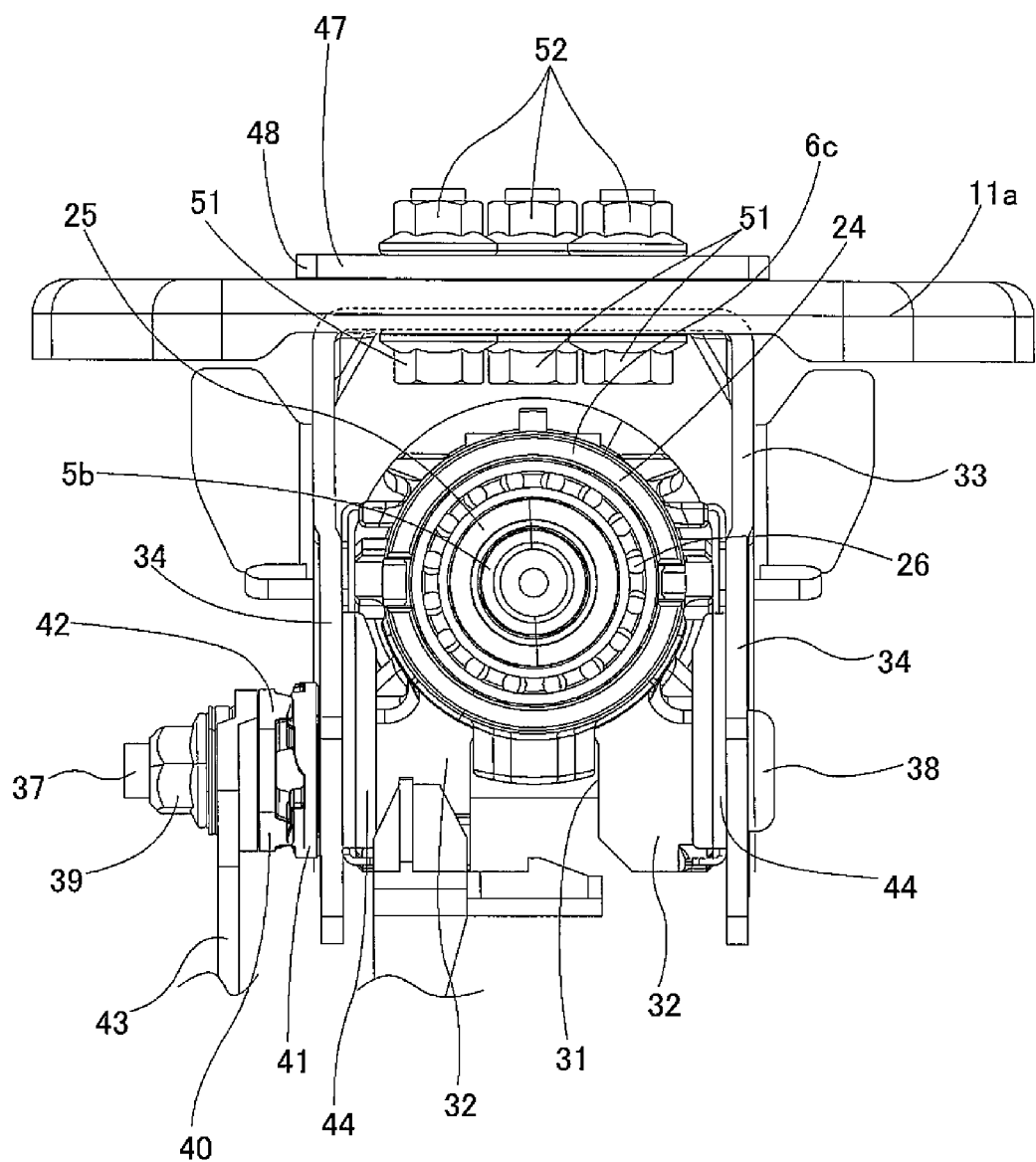
FIG. 2 is an end view of the construction in FIG. 1 with part omitted, and illustrates the state as seen from the rear.
Figure 3:
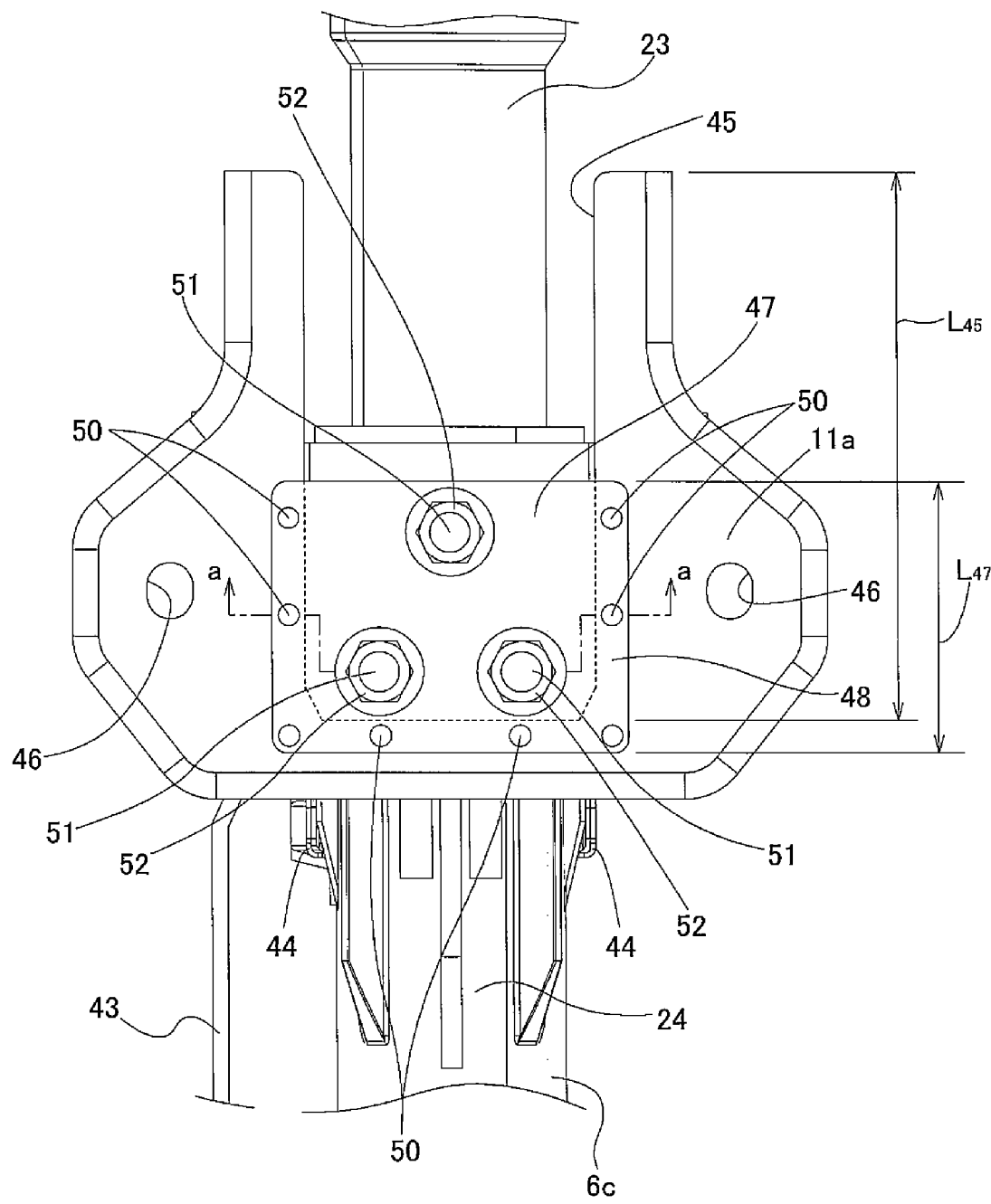
FIG. 3 is a top view of the construction in FIG. 1 with part omitted, and illustrates the state as seen from above.
Figure 4:
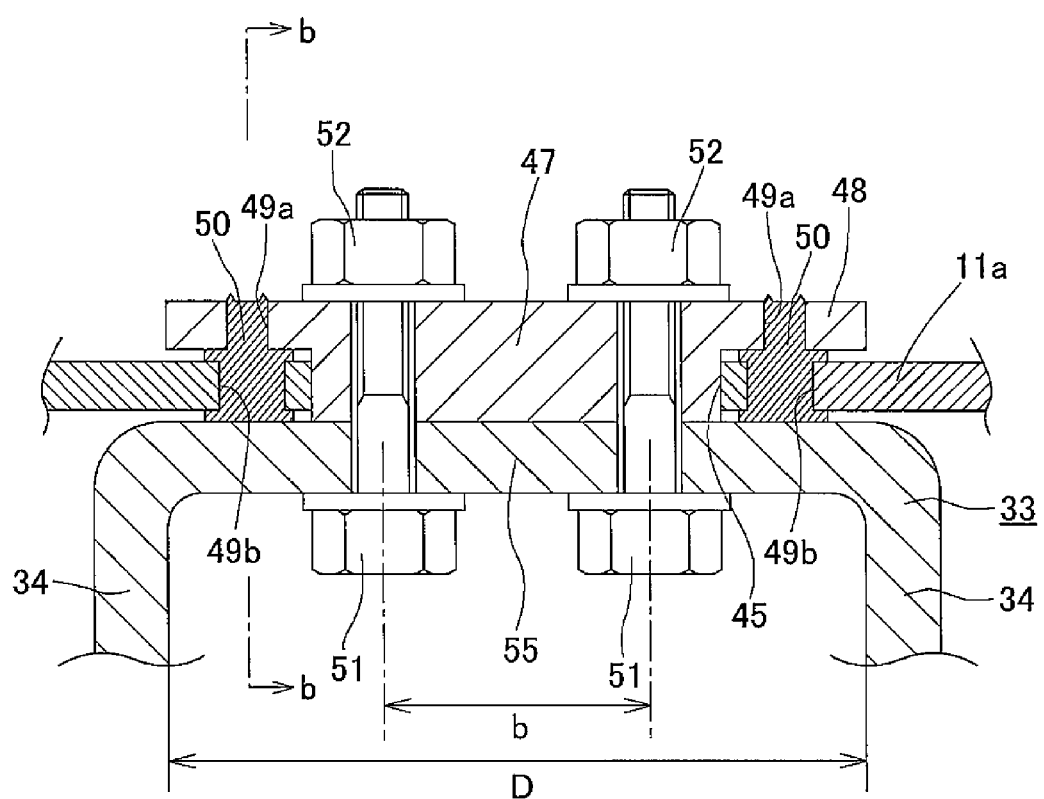
FIG. 4 is an enlarged cross-sectional view of section a-a in FIG. 3, and illustrates a first example of the construction of a connecting section between a bracket on the vehicle side and a bracket on the column side.

The bracket 33 on the column side is connect to the bracket 11a on the vehicle side by way of the locking capsule 47 so as to be able to break away in the forward direction during a secondary collision. In this example, the construction illustrated in FIG. 4 is used as the locking capsule 47. This locking capsule 47 is formed by plastic working such as forging of an iron alloy such as mild steel, die casting a light alloy such as an aluminum alloy or magnesium alloy, or injection molding of a high strength high functional polymer such as polyacetal. The width dimension in the left and right direction and the length dimension in the forward and backward direction are larger in the upper half section (top side section) than in the lower half section (base section), and a flange section 48 that protrudes toward both sides and toward the rear is formed on the upper half section of the locking capsule 47 on the surfaces of both the left and right sides and the rear.

When this kind of locking capsule 47 is locked in (fitted inside) the locking hole 45 that is formed in the bracket 11a on the vehicle side, the locking capsule 47 is supported by the bracket 11a on the vehicle side such that it can break away in the forward direction due to an impact load that is applied during a secondary collision. In order for this, small through holes 49a, 49b are formed in a plurality of aligned locations (eight locations in the example in the figure) in the flange section 48 and in the bracket 11a on the vehicle side in the edges around the locking hole 45. Connecting pins 50 span between these small through holes 49a, 49b. Instead of the small through holes 49b that are formed in the bracket 11a on the vehicle side, it is possible to form small notch sections that are open toward the inside of the locking hole 45. In the present invention, construction using connecting pins is preferable, however, it is possible to omit these connecting pins 50 and employ construction wherein the locking capsule 47 is pressure fitted inside the locking hole 45.

These locking pins 50 can be formed by aligning the small through holes 49a, 49b and injecting synthetic resin into these small through holes 49a, 49b by injection molding and then allowing the synthetic resin to solidify, or pins can be formed into solid cylindrical shapes beforehand using synthetic resin or a light metal alloy, then with a large force in the axial direction, pressure fitting the pins into these small through holes 49a, 49b. In either case, part of the synthetic resin material or light metal alloy material of these connecting pins enters into the space between the top and bottom surfaces of the bracket 11a on the vehicle side and the opposing surfaces to these top and bottom surfaces, which are the bottom surface of the flange section 48 and the top surface of the bracket 33 on the column side, and this eliminates vibration in the installation section between the bracket 11a on the vehicle side and the bracket 22 on the column side. In FIG. 4, for clarity, the height of the space that is the cause of this vibration is drawn larger than actual size.

This locking capsule 47 is connected and fastened to the bracket 33 on the column side by a plurality bolts 51 and nuts 52 (three in the example in the figure) so that they do not separate regardless of any impact load. More specifically, by inserting bolts 51 from the bottom through the through holes that are formed in aligned positions in the locking capsule 47 and bracket 33 on the column side, and then screwing nuts 52 onto the portions on the tip end sections (top end sections) of the bolts 51 that protrude from the top surface of the locking capsule 47, and tightening the nuts 52, the locking capsule 47a and the bracket 33 on the column side are connected and fastened together. Therefore, during a secondary collision, the impact load that is transmitted from the outer column 24 to this bracket 33 on the column side is transmitted as is to the locking capsule 47, and when the connecting pins 50 shear, the outer column 24 also displaces in the forward direction in synchronization with the displacement in the forward direction of the locking capsule 47. FIG. 6 to FIG. 11 illustrate construction wherein the locking capsule 47 and the bracket 33 on the column side are connected and fastened using a plurality of rivets 54 instead of the bolts 51 and the nuts 52. It is possible to connect and fasten the locking capsule 47 and bracket 33 on the column side using rivets 54 or using bolts 51 and nuts 52, and which is used is not related to the scope of the present invention.

On the other hand, the bracket 33 on the column side is made by using a press to punch and bend metal plate having sufficient strength and rigidity such as carbon steel plate. The shape of the bracket 33 on the column side is a U shape that is formed by connecting a pair of left and right support plate sections 34 with a top plate section 55. The portions of the bracket 11a on the vehicle side on both the left and right sides of the locking hole 45 are held between the bottom surface of the flange section 48 that is formed on the upper half section of the locking capsule 47 and the top surface of the top plate section 55, which is a support plate on the underneath side. In this example, the back end section (rear end section) of the locking hole 45 and the rear end section of the lower half of the locking capsule 47 are inclined in a direction such that the width dimension becomes smaller going toward the rear, such that the break away load that causes the locking capsule 47 to break away from the locking hole during a secondary collision is lowered.

Particularly, the bracket 33 on the column side in the construction of this example is such that the front end section of the top plate section 55 extends further toward the front than the edges on the front ends of the support plate sections 34, forming an extending section 57 having a cantilever shape. A convex curved surface 58 having an arc shaped cross section (partial cylindrical surface) is formed on the portion near the front end of the top surface of this extending section 57. The arc that represents the cross-sectional shape of this convex curved surface 58 and a straight line that represents the cross-sectional shape of the portion from the middle section to near the base end on the top surface of the extending surface 57 smoothly connect with each other. In other words, this straight line is continuous in the tangent direction of the arc. Therefore, the convex curved surface 58 is an inclined surface that is inclined in a downward direction going toward the edge on the front end. This kind of convex curved surface 58 can be formed by a cutting process to remove the excess portion, or more preferably, is formed by plastic working using a press.

This is because in plastic working the convex curved surface 58, which is a smooth surface, can be processed efficiently.

Because of its ultrathin construction, it is omitted in the figures, however, a low-friction material layer is located in the area of contact between the top surface of the top plate section 55 and the bottom surface of the portion of the bracket 11*a* on the vehicle side on both the left an right sides of the locking hole 45. This low-friction material layer could be a coating layer made of synthetic resin having a low friction coefficient such as a polyamide resin, polytetrafluoroethylene resin, and the like, or a metal plated layer having self lubrication such as copper or copper alloy or could be a thin plate (sliding plate) made of this kind of resin or metal.

With the construction of this example, constructed as described above, strong local rubbing between the top surface of the top plate section 55 and the bottom surface of the portion of the bracket 11*a* on the vehicle side on both the left and right sides of the locking hole 45 during a secondary collision is prevented and the absolute value of the break away load and variations in the load are kept low. The reason for this is explained below by using a comparison with the construction illustrated in FIG. 8 and FIG. 9 that does not use the construction of this example.

Figure 6:
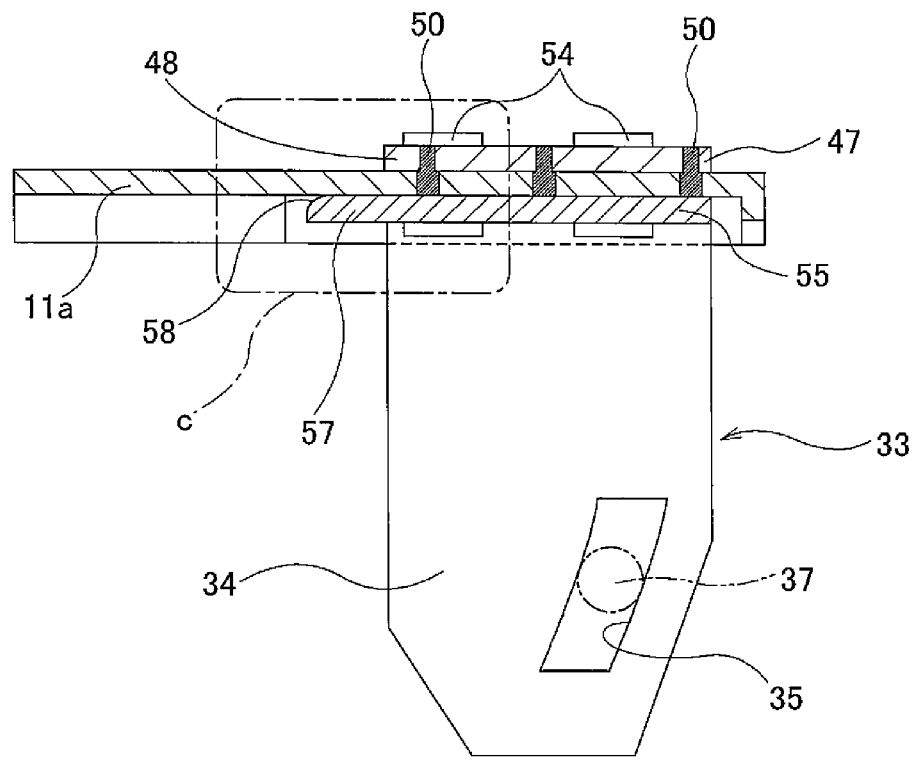
FIG. 6 is a cross-sectional view of section b-b for the first example of the first example of the present invention.
Figure 7:
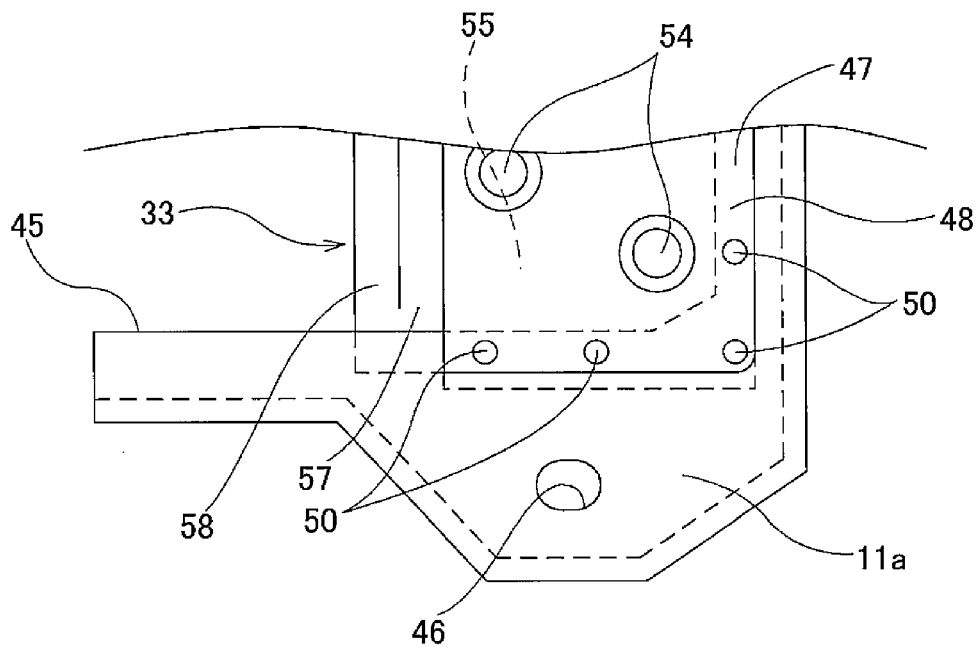
FIG. 7 is a top view of the construction in FIG. 6 with part omitted, and illustrates the state as seen from above.
Figure 8:
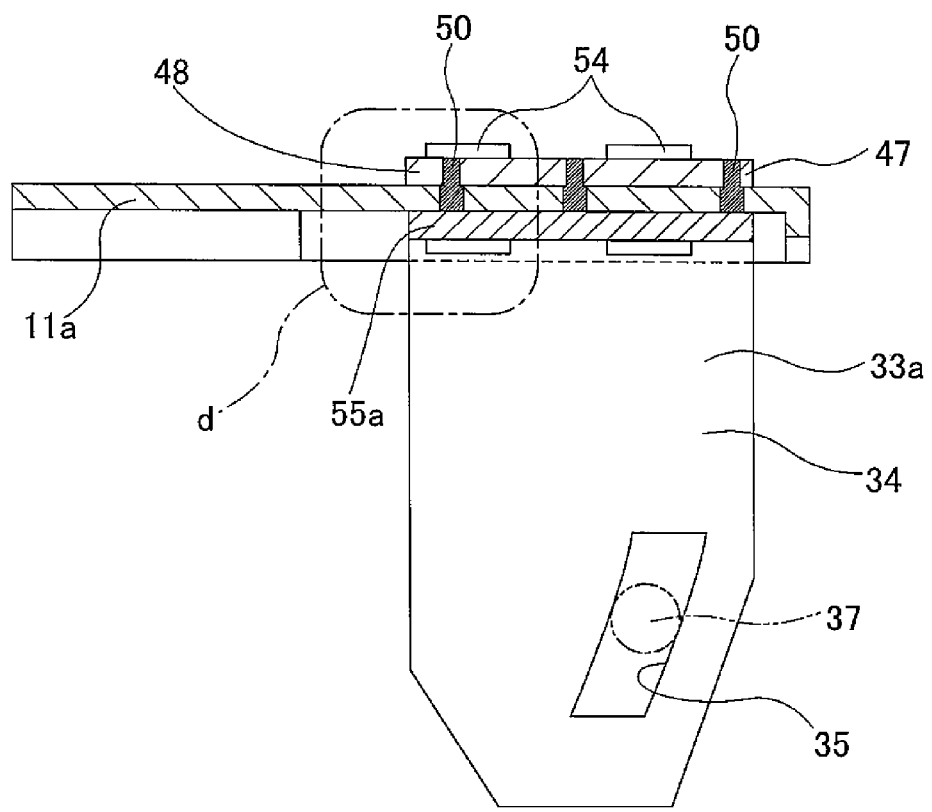
FIG. 8 is a cross-sectional view of section b-b in FIG. 4 for construction separate from the first embodiment of the present invention.

During a secondary collision, the impact load that is transmitted from the steering wheel 1 to the steering column 6*c* by way of the steering shaft 5*b* is inputted to the bracket 33 on the column side by way of the supported plate sections 32, which are a bracket on the displacement side that is formed in part of the steering column, and the adjustment rod 37 that is inserted though the long holes 35 in the up/down direction of the support plate sections 34 of the bracket 33 on the column side. In other words, during a secondary collision, this adjustment rod 37 strongly presses the front inside edges of the long holes 35 in the up/down direction. As a result, a moment in the clockwise direction in FIG. 6 and FIG. 8 is suddenly applied to the bracket 33 on the column side with the adjustment rod 37 as the point where the force acts (input section) and the connecting section between the locking capsule 47 and the bracket 33 on the column side as the fulcrum.

Figure 9:
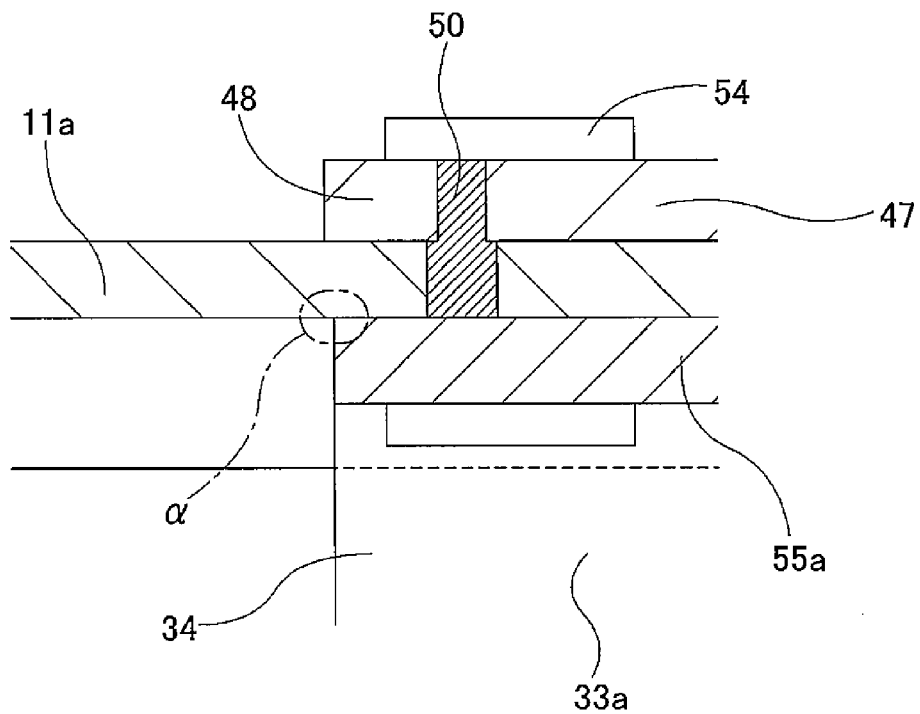
FIG. 9 is an enlarged view of part d in FIG. 8.

In a case where the construction of this example is not used, the top surface of the top plate section 55*a* essentially comes in contact with the bottom surface of the bracket 11*a* on the vehicle side (the space in FIG. 4 is exaggerated), so when this kind of sudden moment is applied, in the portion enclosed in the dot-dash line a in FIG. 9, the front edge section on the top surface of the top plate 55*a* of the bracket 33*a* on the column side is strongly pressed against the bottom surface of the bracket 11*a* on the vehicle side. Therefore, during a secondary collision, the front edge section on the top surface of the top plate section 55*a* is strongly pressed against and bites into the bottom surface of the bracket 11*a* on the vehicle side. As a result, a large friction force acts in the portion. The front edge section on the top surface of the top plate 55*a* is pointed, making it easy for that edge to bite into the opposing surface. Therefore, the load required in order to come out from the locking hole 45 that is formed in the bracket 11*a* on the vehicle side becomes comparatively large.

On the other hand, in the construction of this example, a convex curved surface 58 is formed on the front edge section on the top surface of the extending section 57, so no pointed (cross section having an extremely small radius of curvature) edge comes in contact with the bottom surface of the bracket 11*a* on the vehicle side. Contact is made from the base end section (rear end section) to the middle section of the convex curved surface 58, so the surface area of contact is comparatively large. The extending section 57 is a cantilever shape with the tip end (front end) that comes in contact with the bottom surface of the bracket 11*a* on the vehicle side being the free end, so when the bracket 33 on the column side is displaced by a moment, the extending section 57 is such that the tip elastically deforms in the direction going away from the bottom surface of the bracket 11*a* on the vehicle side. As a result, it is possible to keep the contact pressure at the area of contact between the bottom surface of the bracket 11*a* on the vehicle side and the top surface of the top plate section 55 low, and it becomes difficult for the front edge on the top surface of the extending section 57 to bite into the bottom surface of the bracket 11*a* on the vehicle side. In the case of this example, there is a low-friction material layer at the area of contact between the top surface of the extending section 57 and the bottom surface of the bracket 11*a* on the vehicle side, so it is even more difficult for the convex curved surface 58 to bite into the bottom surface of the bracket 11*a* on the vehicle side. With the construction of this example having these multiple effects, it is possible to keep the absolute value of the break away load and any variation in the load during a secondary collision even lower, and thus design for effectively protecting the driver becomes easier.

In the steering column support apparatus of this example, having construction as described above, by having the bracket 11*a* on the vehicle side and the locking capsule 47 engage at only the center section in the width direction of the bracket 11*a* on the vehicle side, it is possible to simplify tuning for stabilizing the forward displacement of the steering wheel 1 during a secondary collision. A single locking capsule 47 is placed in a portion directly above the outer column 24 in this way, so during a secondary collision, the impact load that is transmitted to the locking capsule 47 from the steering wheel 1 by way of the outer shaft 25 and outer column 24 is applied nearly uniformly to locking pins 50, which are the connecting members that connect the locking capsule 47 and the bracket 11*a* on the vehicle side, and essentially acts on the center section of the locking capsule in the axial direction of the outer column 24. When a force is applied that causes this single locking capsule 47 to come out in the forward direction from the locking hole 45, the locking pins 50 that connect this locking capsule 47 and the bracket 11*a* on the vehicle side essentially shear simultaneously. As a result, displacement in the forward direction of the outer column 24 that is connected to the locking capsule 47 by way of the bracket 33 on the column side can be performed stably with no excessive inclination of the center axis.

Particularly, in the case of this example, presuming this kind of construction, a method of suppressing a rise in contact pressure is further provided, and by suppressing a rise in contact pressure at the area of contact between the front edge sections on the top surface of the support plate on the underneath side, the absolute value of the break away load during a secondary collision and any variation in the load is suppressed. In other words, in construction where the top surface of the top plate section 55 of the bracket 33 on the column side comes in contact with the bottom surface of the bracket 11*a* on the vehicle side, when it is necessary to maintain strength and rigidity of the members, the members are made of a ferrous alloy plate (typically, carbon steel plate). As a result, when a moment is applied during a secondary collision, the bottom surface of the bracket 11*a* on the vehicle side and the front edge on the top surface of the top plate section 55 of the bracket 33 on the column side come in contact over a small surface area, the contact pressure that acts at the area of contact becomes high, so it becomes easy for the front edge of the top surface of the top plate section 55 to bite into the bottom surface of the bracket 11*a* on the vehicle side, and it becomes easy for the absolute value of the break away load and any variations in the load during a secondary collision to become large. On the other hand, in this example, even when the bracket 33 on the column side displaces due to a moment that is applied during a secondary collision, there is no contact between the front edge on the top surface of the underneath support plate that has a pointed shape and the bottom surface of the bracket 11a on the vehicle side, but comes in contact with a portion closer to the base end than the edge on the front end comes in contact and has a comparatively large surface area. Therefore, it is possible to keep the contact pressure at the area of contact low, it becomes difficult for the front edge on the top surface of the top plate section 55 to bite into the bottom surface of the bracket 1a on the vehicle side, and the absolute value and variation of the break away load during a secondary collision is kept low.

Moreover, at the same time, in this example, by forming an extending section 57 that protrudes further toward the front than the edges on the front end of the flange section 48, the front edge of the top surface of the top plate section 55 of the bracket 33 on the column side comes in contact with the bottom surface of the bracket 11a on the vehicle side, however the contact pressure at the area of contact is kept low. In other words, in this case, when the bracket 33 on the column side displaces due to a moment that is applied during a secondary collision, and the front edge on the top surface of the top plate section 55 comes in contact with the bottom surface of the bracket 11a on the vehicle side, the extending section 57 elastically deforms downward. This extending section is a cantilever with the front edge side being the free end, and because the rigidity of this front edge side is low, the contact pressure at the area of contact is kept low. Therefore, it is possible to keep the contact pressure at the area of contact low, it becomes difficult for the front edge of the top surface of the top plate section 55 to bite into the bottom surface of the bracket 11a on the vehicle side, and the absolute value and variations in the break away load can be kept low.

In this example, an inclined surface is formed on the portion near the front end on the top surface of the extending section 57, and by combining the two features described above, an effect of being able to keep the absolute value and variations of the break away load is redundantly obtained, however, a sufficient effect is obtained even if only one of these is used.

Furthermore, in this example, the length $L_{45}$ in the forward/backward direction of the locking hole 45, in which the locking capsule 47 that displaces in the forward direction together with the outer column 6c during a secondary collision, is sufficiently greater than the length $L_{47}$ in the same direction of the locking capsule 47 ($L_{45} \gg L_{47}$). Particularly, in this example, the length $L_{45}$ of the locking hole is 2 times the length $L_{47}$ of the locking capsule 47 or greater ($L_{45} \geq L_{47}$). During a secondary collision, when the locking capsule 47 has displaced all the way forward together with the outer column 24, in other words, even when the locking capsule can no longer displace in the forward direction due to an impact load that was applied from the steering wheel, the portion of at least the rear end section of the flange section 48 of the locking capsule 47 that can support the weight of the steering column 6c and the bracket 33 on the column side does not come out all the way from the locking hole 45. That is, even when the dimension in forward/backward direction of the bracket 11a on the vehicle side is limited, the length (collapse stroke) that the locking capsule 47 displaces in the forward direction during a secondary collision is maintained, and even when the secondary collision advances, the rear end section of the flange 48 that is formed on both sides in the width direction of the upper half of the locking capsule 47 is positioned on the top side of the front end section of the bracket 11a on the vehicle side, and can prevent the locking capsule 47 from dropping. However, when the dimension in the forward/backward direction of the bracket 11a on the vehicle side can be sufficiently maintained, as described above, it is possible to prevent the locking capsule 47 from dropping from the bracket 11a on the vehicle side, and at the same time increase the rigidity of the front section of the bracket 11a on the vehicle side by forming the locking hole to be a closed hole with no opening on the edge of the front end. With this kind of construction, the steering wheel is prevented from dropping excessively, and even after a collision accident, the steering wheel can be easily operated; for example, when a vehicle that was in an accident can move under its own power, it is possible to easily drive the vehicle that was in the accident from the site of the accident to the side of the road.

Furthermore, a pair of left and right protruding sections that protrude further outward in the width direction than the left and right outside surfaces of the bracket 33 on the column side are formed in part of the bracket 33 on the column side, and part of the edges on the top end of these protrusions can be such that they closely face part of the bottom surface of the bracket 11a on the vehicle side. As a result, when a moment around the axial direction is applied to the bracket 33 on the column side, and the bracket 33 on the column side inclines a little, part of the edge on the top end of one of the protruding sections comes in contact with the part of the bottom surface of the bracket 11a on the vehicle side, making it possible to prevent the bracket 33 on the column side from inclining more than this. With this kind of construction, even though a moment is applied to the bracket 33 on the column side, the amount of relative displacement between the bracket 33 on the column side and the bracket 11a on the vehicle side can be kept to a small amount, and it is possible to prevent a force from being applied to the bracket 33 on the column side and the locking capsule 47 that is capable of damaging these members.

Moreover, in this example, together with providing a tilt and telescopic mechanism, friction plate units 44 are provided in order to increase the holding force for holding the steering wheel 1 in an adjusted position. Providing the tilt and telescopic mechanism and the friction plate unit 44, because of accumulation of manufacturing errors, easily become a cause for variation in the break away load during a secondary collision, however, in this example, through the engagement of the single locking capsule 47 and bracket 11a on the vehicle side it is possible to suppress this kind of variation in break away load. As a result, it is possible to perform proper tuning for lessening the impact applied to the body of the driver that collides with the steering wheel 1 during a secondary collision, making it possible to more completely protect the driver.

Figure 5:
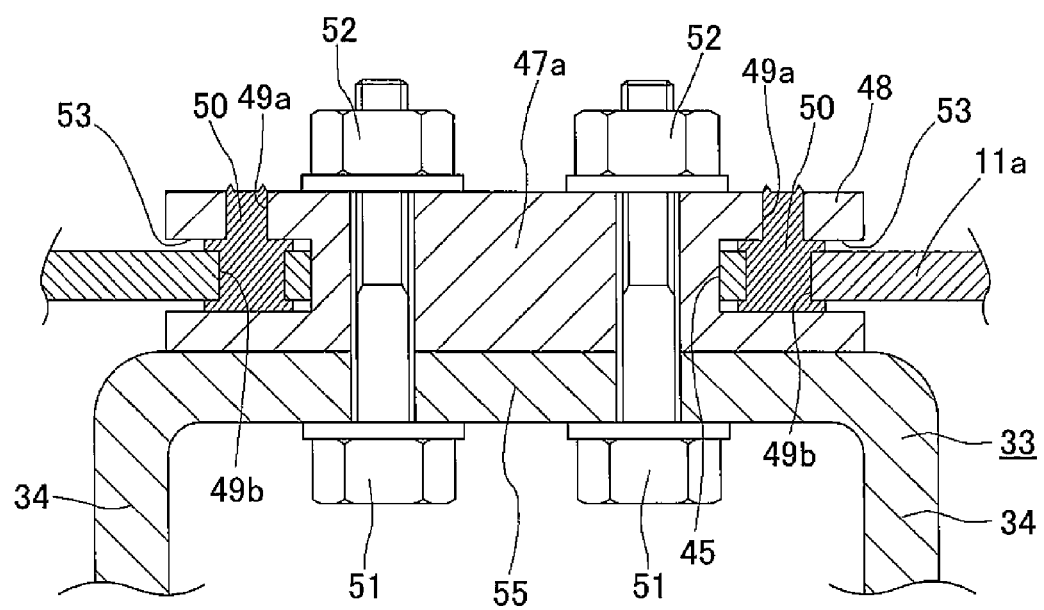
FIG. 5 is a cross-sectional view similar to FIG. 4, and illustrates a second example of the construction of a connecting section between a bracket on the vehicle side and a bracket on the column side.

In the steering column support apparatus of the present invention, instead of the locking capsule 47 illustrated in FIG. 4, it is also possible to employ the locking capsule 47a having the construction illustrated in FIG. 5. The locking capsule 47 illustrated in FIG. 4 has a simple shape, and in addition to suppressing manufacturing costs, the assembly height of the portion where the locking capsule is installed is kept low, so is advantageous from the aspect of being capable of making the steering column support apparatus more compact and lightweight, and stabilizing the break away load of the engagement section between the bracket 11a on the vehicle side and the locking capsule 47 by shortening the distance between the center axis of the outer column 24, which is the position where the impact load acts, and the engagement section (suppresses torsion due to this length becoming long).

However, the construction illustrated in FIG. 5 is advantageous from the aspect of simplifying injection molding of the connecting pins 50. In other words, in the case of the construction illustrated in FIG. 4, when performing injection molding of the connecting pins 50, it is necessary to perform injection molding with the bracket 11a on the vehicle side, the locking capsule 47 and the bracket 33 on the column side connected by the bolts 51 and nuts 52, however, in the case of the construction illustrated in FIG. 5, only the bracket 11a and the locking capsule 47a need to be set in the die for performing injection molding of the connecting pins 50, so the die can easily be made more compact. In other words, this locking capsule 47a has locking grooves 53 that are formed on the surface of the left and right sides, and the edges on both sides of the locking hole 45 of the bracket 11a on the vehicle side engage with these locking grooves 53. Therefore, it is possible to connect and fasten together the locking capsule 47a and the bracket 33 on the column side with the bolts 51 and nuts 52 after the bracket 11a on the vehicle side and the locking capsule 47a have been connected by the connecting pins 50.

Figure 35:
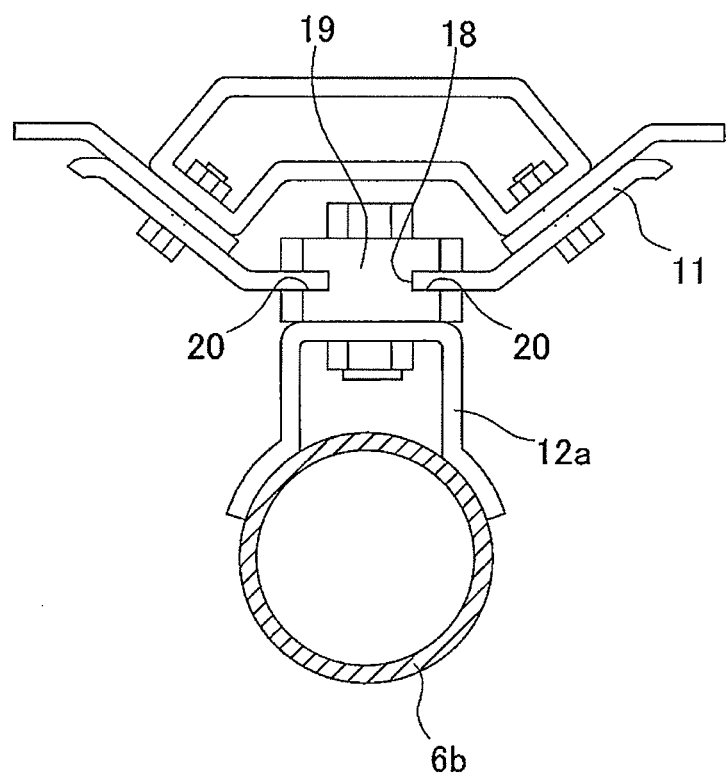
FIG. 35 is a cross-sectional view illustrating an example of conventional construction, and is related to a virtual plane that exists in a direction orthogonal to the center axis of the steering column.
Figure 36:
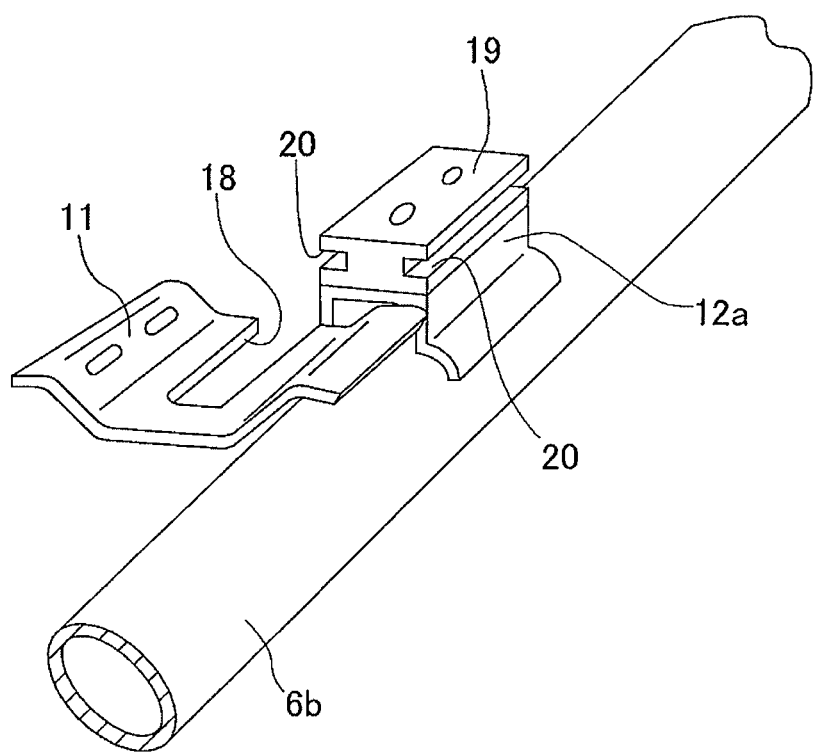
FIG. 36 is a perspective view of the construction illustrated in FIG. 35, and illustrates the state before the bracket on the vehicle side and the bracket on the column side are connected.
Figure 37:
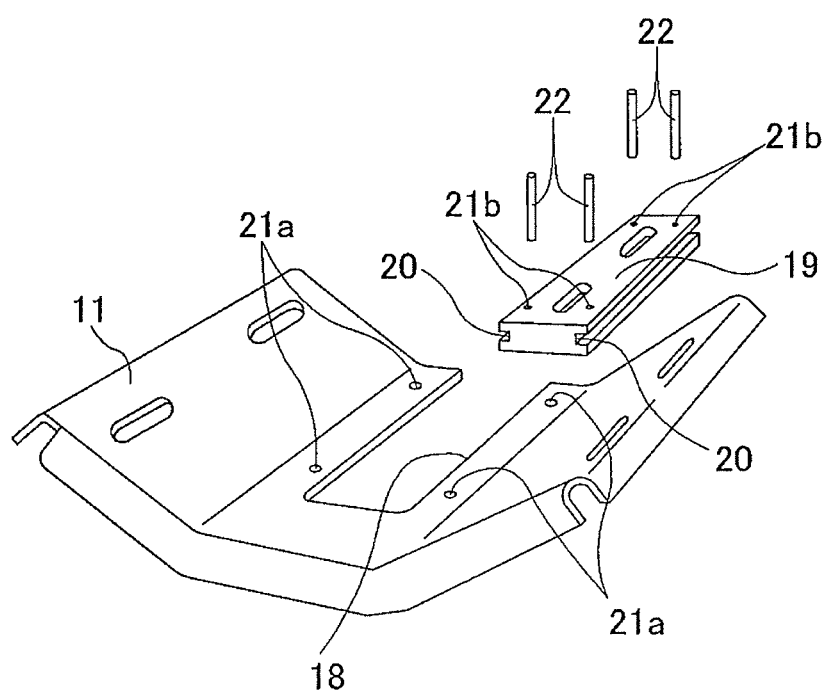
FIG. 37 is a perspective view of the construction illustrated in FIG. 36 with the steering column omitted and the connecting pins depicted.

In the locking capsule 47a having the construction illustrated in FIG. 5, as in the conventional construction illustrated in FIGS. 35 to 37, as long as the locking capsule 47a is made of a light alloy or a synthetic resin, it becomes difficult for the top surface of the bottom plate section 56 that defines the bottom side of the locking groove 53 of the locking capsule 47a to bite into the bottom surface of the bracket 11a on the vehicle side, so the possibility that the absolute value and variation of the break away load will become large is low. However, in this case as well, depending on the conditions, there is a possibility that due to being affected by the moment described above, the absolute value and variation of the break away load cannot always be kept sufficiently low. Moreover, in the case where for reasons such as maintaining strength and rigidity, the locking capsule 47a is made of a ferrous alloy, there is a possibility for the same reason that the absolute value or variation of the break away load could become large. In other words, there is a possibility that the front edge of the top surface of the bottom plate section 56 of the locking capsule 47a will come in strong contact with the bottom surface of the bracket 11a on the vehicle side due to the moment described above, causing the absolute value or variation of break away load to increase. In this case, the bottom plate section 56 corresponds to the underneath support plate and it is possible to provide a way to suppress a rise in contact pressure by: (1) forming an inclined surface on the portion near the front end of the top surface of this bottom plate section that is inclined downward going toward the front edge of the bottom plate section 56; (2) providing an extending section on the front end section of the bottom plate section 56 that protrudes further toward the front than the edge on the front end of the flange section 48; or (3) forming an inclined surface on the portion near the front end on the top surface of the extending section of the bottom plate section 56 that is inclined downward going toward the edge on the front end of the extending section.

Second Example of First Embodiment

Figure 10:
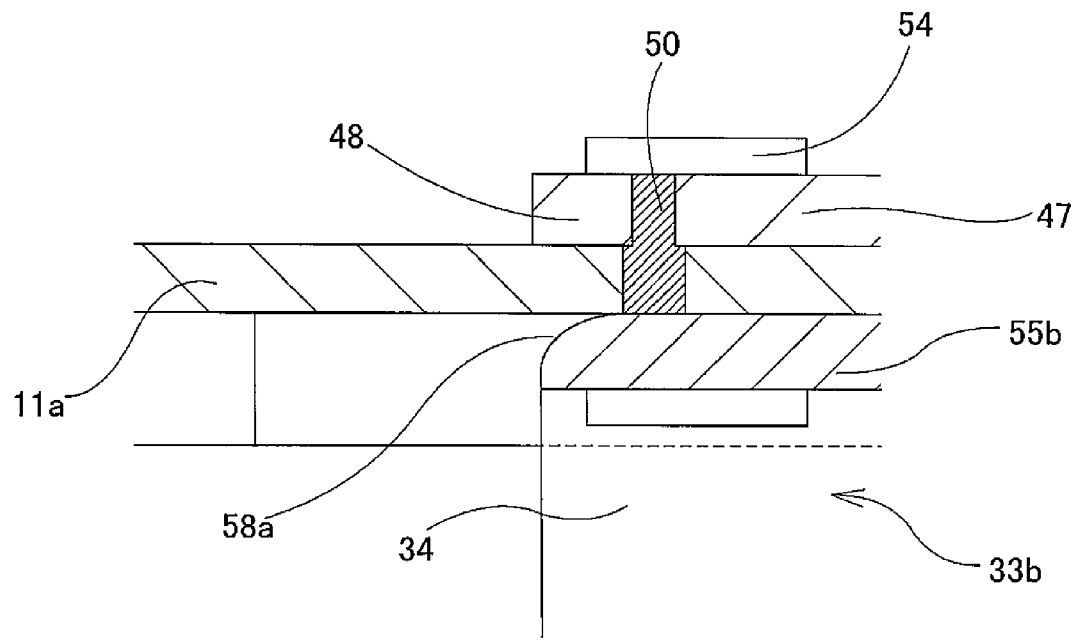
FIG. 10 is an enlarged view of a portion of a second example of the first embodiment which corresponds to part c in FIG. 6.

FIG. 10 illustrates a second example of the first embodiment of the present invention. In the case of this example, a convex curved surface 58a is formed on the top surface of the front end section of the top plate section 55b of the bracket 33 on the column side, and there is no extending section 57 such as in the first example of the first embodiment. In the construction of this example, compared with the case of the first example, the effect of stabilizing and keeping the break away load low during a secondary collision is somewhat low, however, when compared with the construction illustrated in FIG. 8 and FIG. 9, can stabilize and keep this break away load low. The construction and functions of other parts are the same as in the first embodiment, so drawings and explanations of identical parts are omitted.

Third Example of First Embodiment

Figure 11:
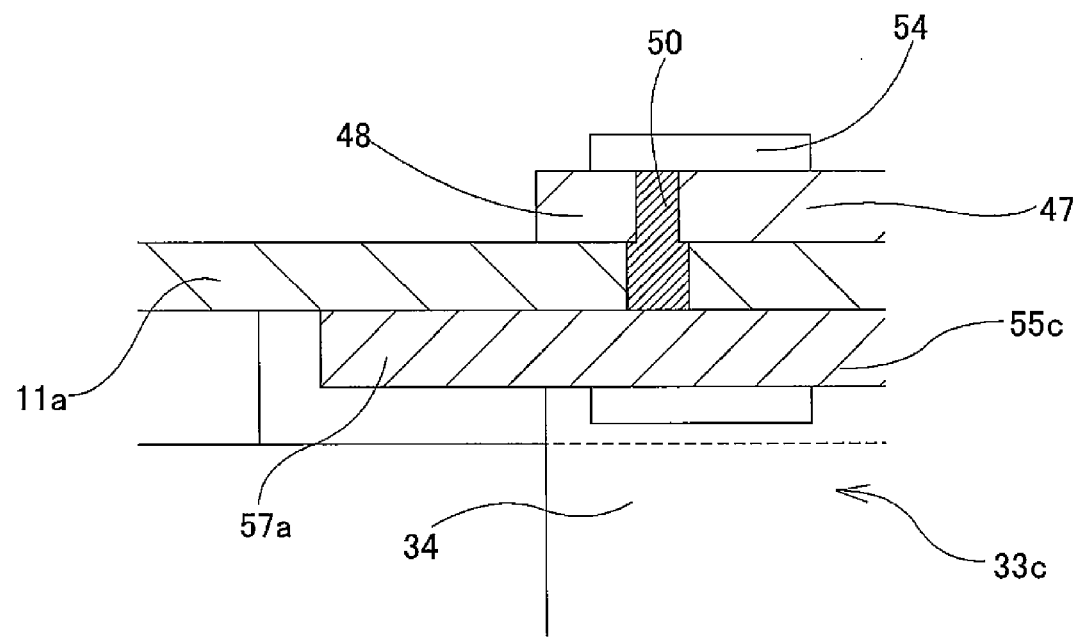
FIG. 11 is a view similar to FIG. 10, and illustrates a third example of the first embodiment of the present invention.
Figure 12:
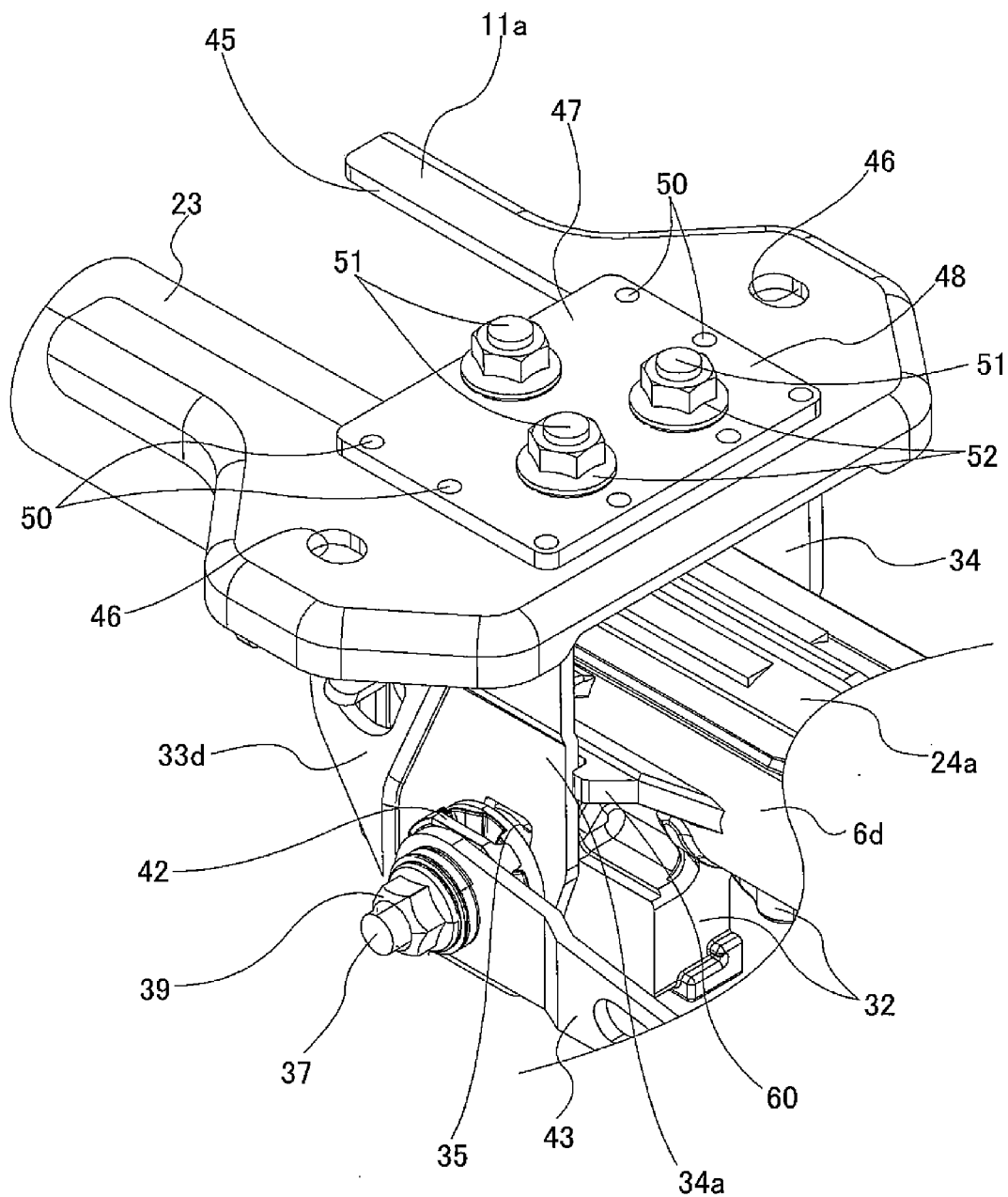
FIG. 12 is a perspective view of the main section of a first example of a second embodiment of the present invention which corresponds to the center section in FIG. 1.
Figure 13:
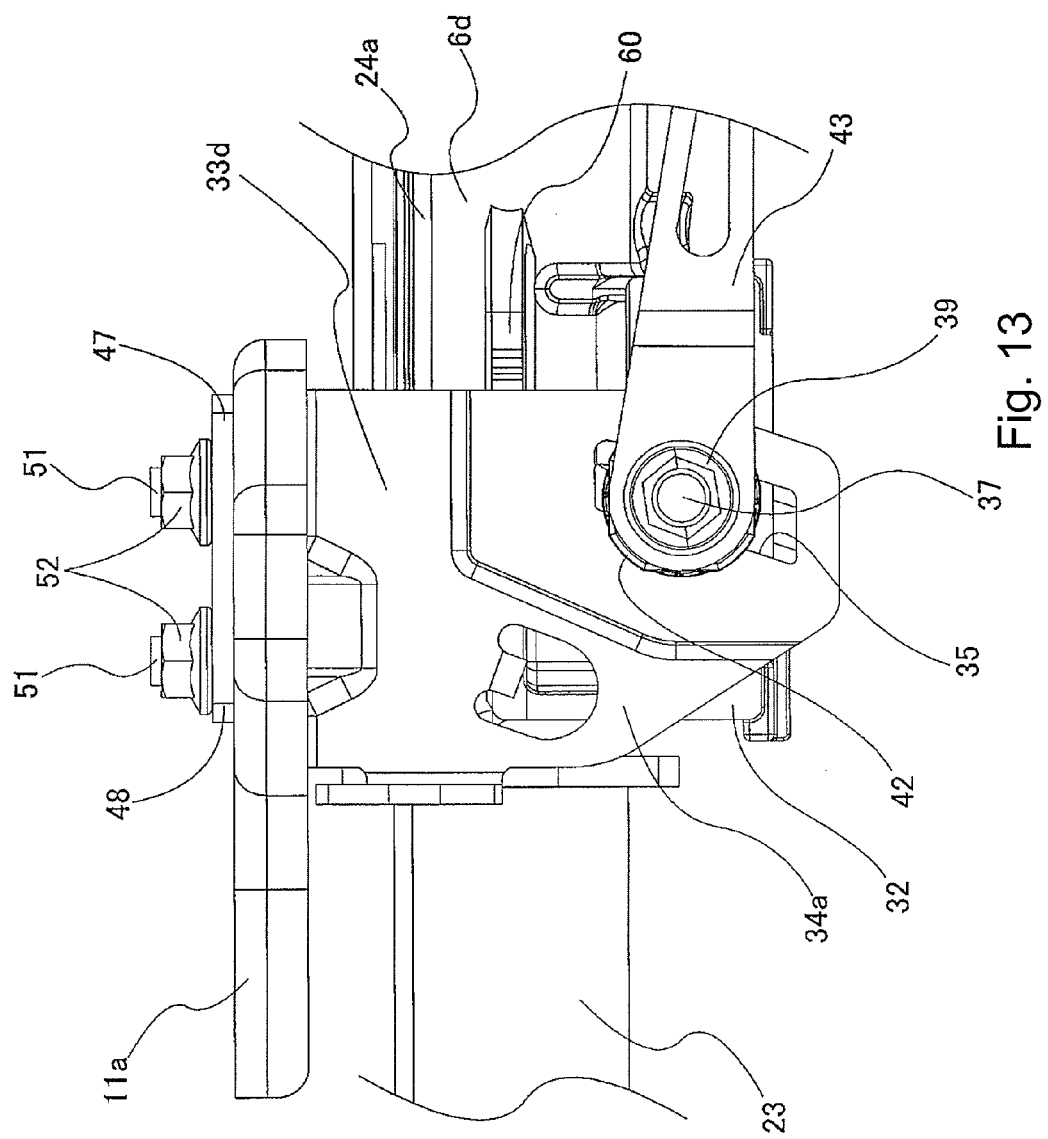
FIG. 13 is a side view of the main section shown in FIG. 12 as seen from the side.
Figure 14:
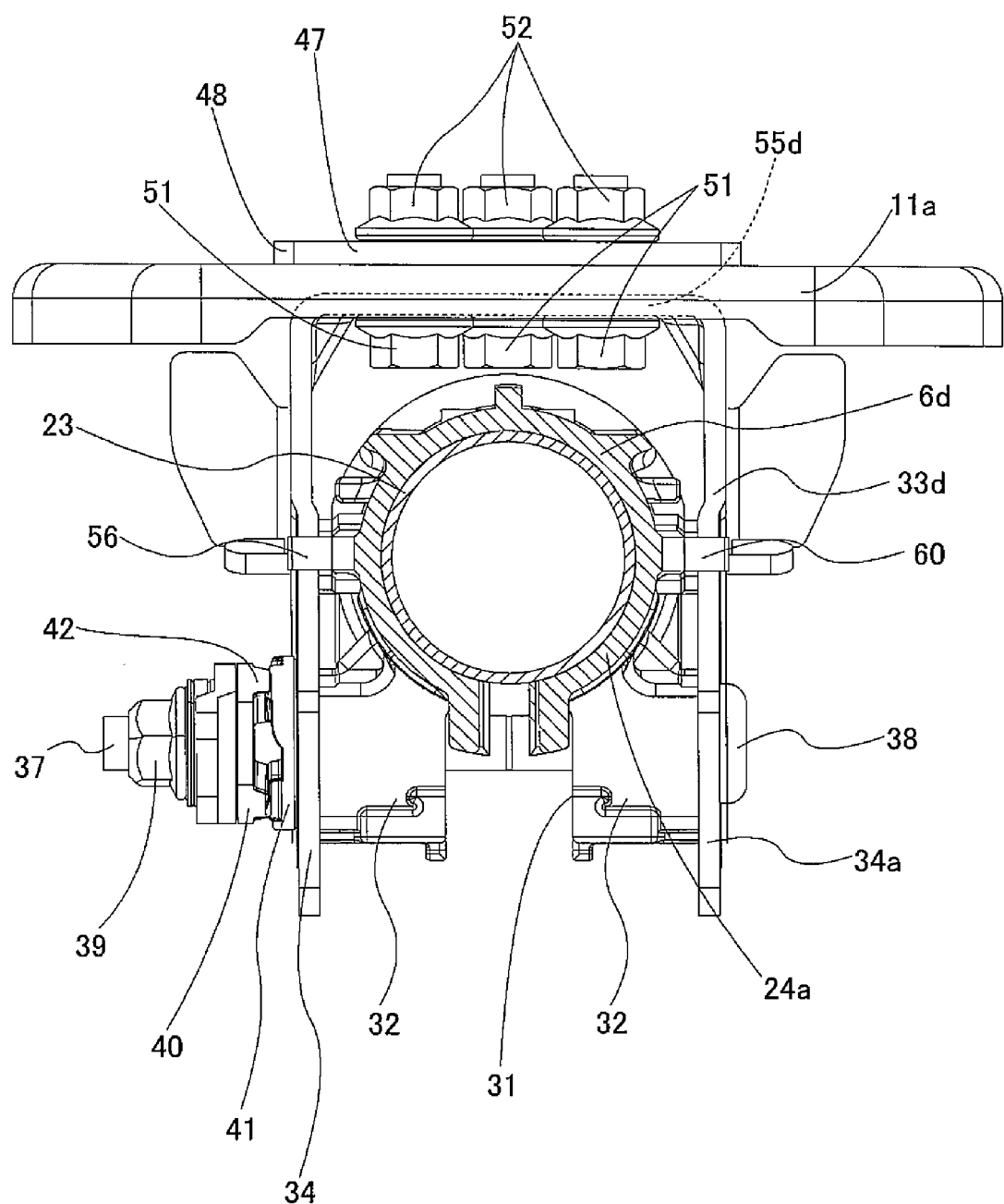
FIG. 14 is a drawing illustrating the state as seen from the right in FIG. 13 with part omitted, and is a cross-sectional view of the steering column and illustrates the connecting section between the outer column and the inner column.
Figure 15:
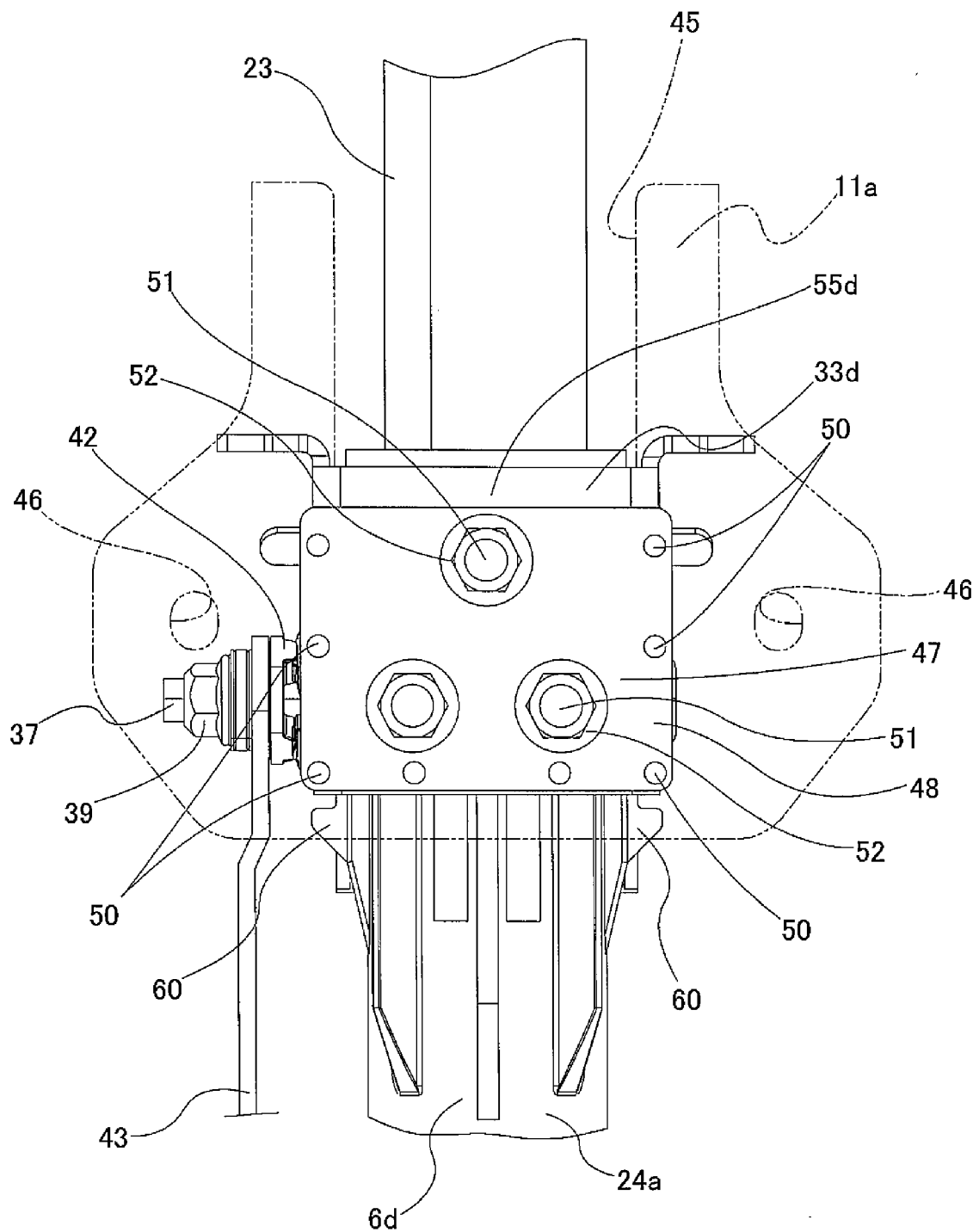
FIG. 15 is a top view of the main section shown in FIG. 14 as seen from above with the bracket on the vehicle side omitted.
Figure 16:
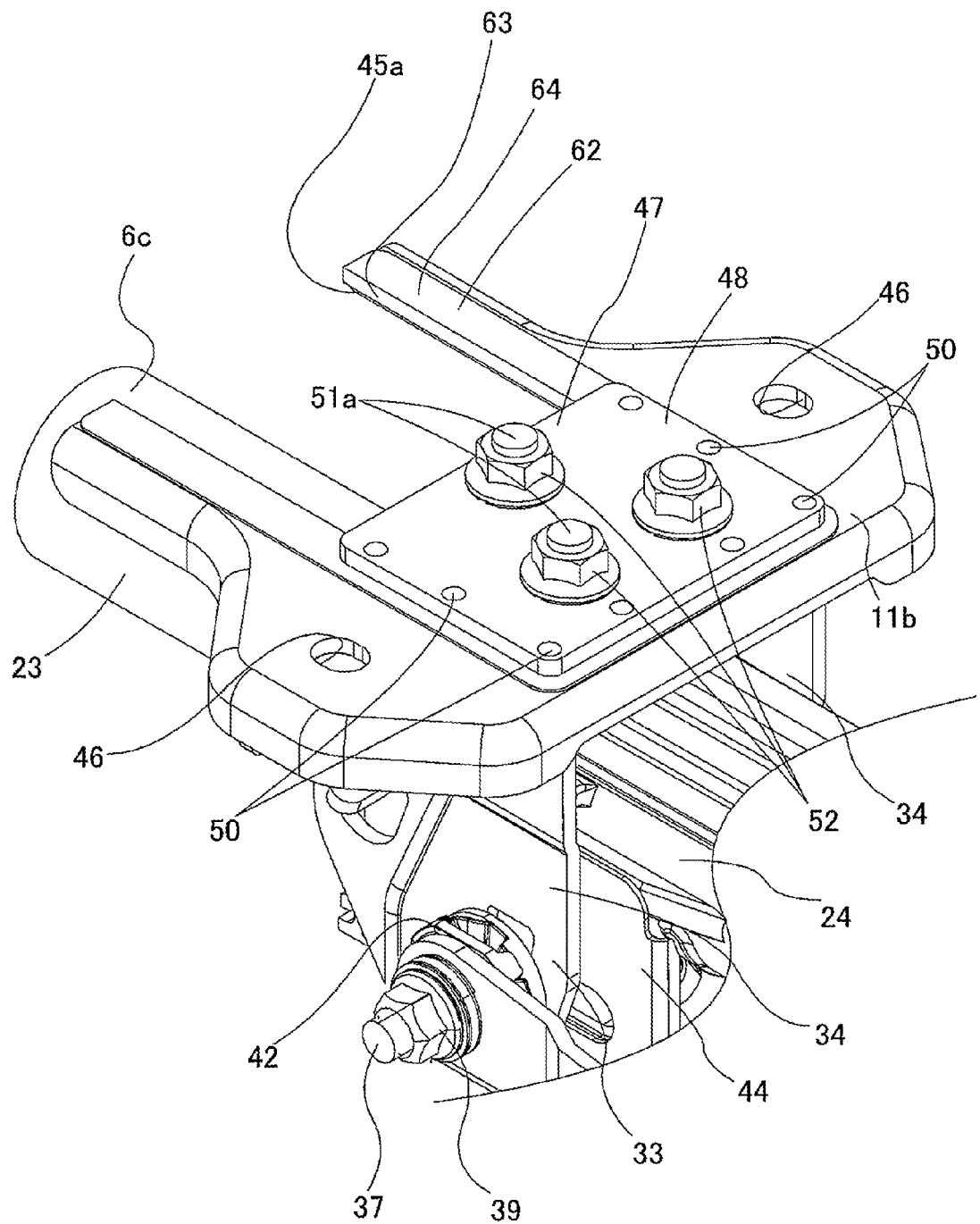
FIG. 16 is a perspective view of a main section of a first example of a third embodiment of the present invention, which corresponds to the center section in FIG. 1.

FIG. 11 illustrates a third example of the first embodiment of the present invention. In this example, an extending section 57a is provided on the front end section of the top plate section 55c of the bracket 33 on the vehicle side, however, there is no convex curved surface 58 as in the first example of the first embodiment. In the construction of this example, compared with the case of the first example, the effect of stabilizing and keeping the break away load low during a secondary collision is somewhat low, however, when compared with the construction illustrated in FIG. 8 and FIG. 9, can stabilize and keep this break away load low. The construction and functions of other parts are the same as in the first embodiment, so drawings and explanations of identical parts are omitted.

Embodiment 2

FIG. 12 to FIG. 15 illustrate an example of a second embodiment of the present invention that can be alternatively applied to or additionally added to the first embodiment of the present invention. The basic construction and function are the same as the construction of the first embodiment, so drawings and explanations of identical parts are either omitted or simplified, such that the explanation below centers on the features of this example. As can clearly be seen from FIG. 12 to FIG. 15, this example is at least applied to construction in which there is no friction plate unit 44 for increasing the holding force of keeping the steering wheel in the adjusted position.

In the case of the steering column support apparatus of this example, a pair of protruding pieces 60 are fixed in the middle section in the circumferential direction of the outer column 24a of the steering column 6d in the portion further toward the rear side than the pair of support plate sections 34a of the bracket 33 on the column side. The outer column 24a is formed as a single member by die casting using a light alloy metal such as aluminum alloy or magnesium alloy, and the protruding pieces 60 are formed at two locations on opposite sides in the radial direction of the surfaces on the left and right sides of the outer column 24a such that they protrude toward the left and right sides from portions having the same height and position in the axial direction. The edges on the front sides of the protruding pieces closely face portions of the edges on the rear sides of the support plate sections 34a further toward the top side than the adjustment rod 37.

During normal operation, as much space as possible is provided between the edges on the front sides of the protruding pieces 60 and the edges on the rear sides of the support plate sections 34a so that adjustment of the up/down position of the steering wheel 1 is possible. In other words, even when the steering column 6d is pivoted around the horizontal shaft that is inserted through the center hole 30 of the support cylinder 29 (see FIG. 1) in order to perform up/down adjustment of the steering wheel 1, there is enough space such that the edges on the front sides of the protruding pieces 60 do not rub against and interfere with the edges on the rear sides of the support plate sections 34a. However, the edges on the front sides of the protruding pieces 60 are brought as close as possible to the edges on the rear sides of the support plate sections 34a as long as interference between these edges can be prevented. When a secondary collision occurs, the adjustment rod 37 displaces to the rear end section of the long holes 36 in the forward/backward direction illustrated in FIG. 1, and further presses against the rear end sections of these long holes 36 in the forward/backward direction, so there is a possibility that the adjustment rod 37 will strongly press against the inside edges on the front side of the long holes 35 in the up/down direction that are formed in the support plate sections 34a, however, construction is such that before that happens, the edges on the front sides of the protruding pieces 60 will come in contact with the edges on the rear sides of the support plates 34a. In other words, during a secondary collision, the impact load that is transmitted from the outer column 24a of the steering column 6d to the bracket 33d on the column side is transmitted by way of the contact section between the protruding pieces 60 and the edges on the rear sides of the support plate sections 34a without going though the adjustment rod 37.

With this example that uses this kind of construction, the absolute value or variation of the break away load is kept low by preventing the edge section on the front end of the top surface of the top plate section 55d from coming into strong local rubbing with the bottom surface of the portion of the bracket 11a on the vehicle side on both the left and right sides of the locking hole 45. In other words, the distance from the area of contact between the edges on the front sides of the protruding pieces 60 an the edges on the rear sides of the support plate sections 34a to the engagement section between the locking hole 45 that is formed in the bracket 11a on the vehicle side and the locking capsule 47 that is fastened to the top surface of the top plate section 55d of the bracket 33d on the column side is sufficiently shorter than the distance from the adjustment rod 37 to this engagement section. The distance from the input section (point where the force is applied) of the moment to the engagement section, which is the fulcrum, is related to keeping the force that is applied in a twisting direction to this engagement section low. Therefore, it is possible to keep the absolute value or variation of the break away load low by reducing the friction force acting on this engagement section.

The case was explained of applying the steering column support apparatus of this example to a tilting and telescopic type steering apparatus, however, from the aspect of stabilizing the function and effect described above, applying this example to construction having only a tilt mechanism, or in other words, construction that does not have a telescopic mechanism is preferred. At least, in the case of construction such as in the case of the first embodiment illustrated in FIGS. 1 to 3 where in a friction plate unit 44 is assembled for increasing the holding force for keeping the steering wheel in an adjusted position, or in the case of a so-called positive type telescopic mechanism that uses a gear (rack) type position fixing construction, as a result of making the holding force greater than the impact load that is applied during a secondary collision, there is a possibility that the position of the steering wheel during this secondary collision will not displace to the very front adjustable position. In the case of a steering columns support apparatus having this kind of positive type telescopic mechanism, the outer surface on the front side of the adjustment rod 37 becomes the force input section before the edges on the front ends of the protruding pieces 60 and the edges of the rear ends of the support plate sections 34a of the brackets 33d on the column side come in contact, so the possibility that the inside edges on the front sides of the long holes 35 in the up/down direction that are formed in the portions toward bottom of the support plate sections 34a of the bracket 33d on the column side will be pressed strongly in forward direction becomes high. Because of this reason, applying this example to a steering apparatus having a positive type telescopic mechanism is not preferred.

Even in the case of applying this example to a steering apparatus having only a tilt mechanism, in order to obtain the function and effect of the present invention, it is necessary that the edges on the front ends of the protruding pieces 60 come in contact with the edges on the rear ends of the support plate sections 34a of the bracket 33d on the column side before the outer surface of the adjustment rod 37 comes in contact with the inside edges on the front sides of the long holes in the up/down direction that are formed in the support plate sections 34a of the bracket 33d on the column side. Therefore, regardless of the adjusted height position of the steering wheel 1, it is necessary that the distance between the outer surface of the adjustment rod 37 and the inside edges on the front sides of the long holes 35 in the up/down direction be greater than the distance between the edges on the front ends of the protruding pieces 60 and the edges on the rear ends of the support plate sections 34a. Therefore, preferably the distance between the edges on the front sides of the protruding pieces 60 and the edges on the rear ends of the support plate sections 34 is made to always be short by increasing the distance between the outer surface on the front side of the adjustment rod 37 and the inside edges on the front side of the long holes 35 in the up/down direction by sufficiently maintaining the width dimensions in the forward/backward direction of the long holes in the up/down direction, or by making the edges on the rear ends of the support plate sections 34a a convex curved arc shape that is centered around a horizontal axis (the center axis of the bolt that is inserted through the center hole 30 of the support cylinder 29) that is the center of pivoting of the steering column 6d, regardless of the adjusted height position of the steering wheel 1. However, the present invention can be applied even in the case of a steering apparatus having only a telescopic mechanism as long as there is no positive type construction such as described above, and as long as construction is such that a rod shaped member such as the adjustment rod 37 be located underneath the steering column 6d.

Furthermore, in this example, preferably the pair of left and right protruding pieces 60 are at a position having the same height so that there is no extra force applied to the bracket 33d on the column side in a twisting direction. In the example in the figure, the pair of protruding pieces 60 is located at two positions on opposite sides in the radial direction where the dimension in the width direction of the outer column 24a is the greatest, and the amount that these protruding pieces 60 protrude from the outer surface of the outer column 24 is kept small. However, by making the protruding amount large, the position of the pair of left and right protruding pieces can be closer to the bracket 11a on the vehicle side on the top side. The closer the position of these protruding pieces is to the bracket 11a on the vehicle side, or in other words, the higher they are, or most preferably, when they are located on the top end section of the outer column 24a, it is possible to keep the force applied to the engagement section between the locking hole 45 that is formed in the bracket 11a on the vehicle side and the locking capsule 47 that is fastened to the top surface of the top plate section 55d of the bracket 33d on the column side in a twisting direction small.

First Example of Third Embodiment

FIG. 16 to FIG. 20 illustrate a first example of a third embodiment of the present invention. The feature of this example is being able to smoothly separate (break away) the locking capsule 47 from the bracket 11b on the vehicle side by devising the construction of the connection between the bracket 11b on the vehicle side and the locking capsule 47 that is connected and fastened to the bracket 33 on the column side. The construction and functions of the other parts are the same as in the construction of the first embodiment, so drawings and explanations of identical parts are omitted or simplified such that the explanation below centers on the feature of this example.

In this example, the locking capsule 47 is connected and fastened to the top surface of the bracket 33 on the column side by plurality of bolts 51a and nuts 52 (three in the example in the figure). In this example, the head sections 61 of the bolts 51a are flat disc shaped so as to suppress the assembly height of the steering column. However, the bracket 33 on the column side and the steering capsule 47 can be connected and fastened by rivets as illustrated in FIG. 6 to FIG. 11.

In this example as well, the rear half section of the locking hole (locking notch) 45a that is formed in the bracket 11b on the vehicle side is a similar shape but a little larger than the lower half section of the locking capsule 47. That is, the width dimension of the locking hole 45a is a little larger than the width dimension of the portion of the lower half section of the locking capsule 47 when the forward/backward positions coincide in the combined state illustrated in FIG. 16. The amount that the width dimension of the locking hole 45a is larger than the width dimension of the lower half section of the locking capsule is two times the thickness dimension of the hanging plate section 63 of the sliding plate 62 or greater.

The bracket 33 on the column side and the locking capsule 47 are connected to the bracket 11b on the vehicle side by way of a plurality of connecting pins 50. This sliding plate 62 is formed by bending metal plate, having a smooth surface (small surface roughness) and preferably having a low surface friction coefficient and a certain amount of rigidity (does not have low rigidity such as foil), into a flat U shape that is open toward the front and has a L shaped cross-section. Preferably, metal plate such as steel plate having a coating layer made of synthetic resin having low friction such as polyamide resin or polytetrafluoroethylene resin on the surface is used as this metal plate. In addition to this, it is also possible to use hard metal plate that is anti corrosive such as stainless spring steel plate, or metal plate having lubricating properties such as phosphor copper bronze plate. Furthermore, it is also possible to combine the locking capsule made of synthetic resin or light metal alloy and the sliding plate made of synthetic resin.

In either case, the sliding plate 62 comprises a flat installation plate section 64, and a hanging plate section 63 that is formed by bending the inside edge of the installation plate section 64 downward. The shape and size of the outside surface (outer perimeter surface) of this hanging plate section 63 is nearly the same shape and size as the inside edge of the locking hole 45a. Therefore, in this example, the rear end section of the hanging plate section 63 is inclined in a direction such that the space between them becomes narrower going toward the rear. Consequently the hanging plate section 63 is fitted inside the locking hole 45a such that there is hardly any space. With the hanging plate section 63 fitted inside the locking hole 45a, the bottom surface of the installation plate section 64 is essentially placed on the top surface of the bracket 11b on the vehicle side so that there is no space between these surfaces except for any unavoidable small spaces. Furthermore, the lower half section of the locking capsule 47 fits inside the hanging plate section 63, and with the bottom surface of the flange section 48 in contact with the top surface of the installation plate section 64 with essentially no space between surfaces, the locking capsule 47 is assembled inside the locking hole 45a by way of this sliding plate 62.

With the sliding plate 62 and the locking capsule 47 assembled inside the locking hole 45a, the portion of the inside edge of the locking hole 45a except the bottom end section is covered by the hanging plate section 63. The lower end section is located in a more recessed location than the hanging plate section 63. Furthermore, the installation plate section 64 is held between the bottom surface of the flange section 48 of the locking capsule 47 and the top surface of the bracket 11b on the vehicle side in the portion that surrounds the locking hole 45a. A plurality of small through holes 49a, 49b, 49c are formed in the portions surrounding the flange section 48, locking hole 45a and installation plate section 64 that are aligned with each other. By performing injection molding to inject synthetic resin inside these small through holes 49a 49b, 49c, and letting the synthetic resin solidify, connecting pins 50 are formed so as to span between these small through holes 49a, 48b, 49c. These connecting pins 50 are connecting members that shear due to an impact load that is applied during a secondary collision. In this way, the locking capsule 47 is connected and supported by the bracket 11b on the vehicle side so that the locking capsule 47 can displace in the forward direction due to an impact load that is applied during a secondary collision.

With the steering column support apparatus of this example, constructed as described above, it is possible to keep the load required for causing the locking capsule 47, which is supported by the steering column 6c by way of the bracket 33 on the column side, to start coming out in the forward direction from the locking hole 45a, which is formed in the bracket 11b on the vehicle side, low. In other words, in the case of the steering column support apparatus of this example, a large portion of the inside edge of the locking hole 45a is covered by the hanging plate section 63 of the sliding plate 62, and the remaining portion is located in a more recessed position than the hanging plate section 63. Therefore, there is no direct rubbing between the surfaces on the sides of the locking capsule 47 and the inside edges of the locking hole 45a regardless of the direction in which the impact load that is applied to the locking capsule acts during a secondary collision.

Therefore, even when the inside edges of the locking hole 45a are rough surface with exposed fractures, the friction force that acts between the surfaces on the sides of the locking capsule 47 and the opposing surfaces does not become large. Consequently, even when a large diagonal force in the forward direction is applied from the steering wheel 1 to the locking capsule 47 such as illustrated by the X and Y arrows in FIG. 18, it is possible for the locking capsule 47 to be separated from the bracket 11b on the vehicle side smoothly by light force, thus more completely protecting the driver. In the case of this example, as in the first embodiment, the shape of the locking hole 45a and the rear end section of the lower half section of the locking capsule 47 is such that the width dimension becomes smaller going toward the rear, so the locking capsule 47 can even more easily start to displace and come out in the forward direction from the locking hole 45a, and thus it is possible to even more completely protect the driver during a collision accident.

Second Example of Third Embodiment

Figure 21:
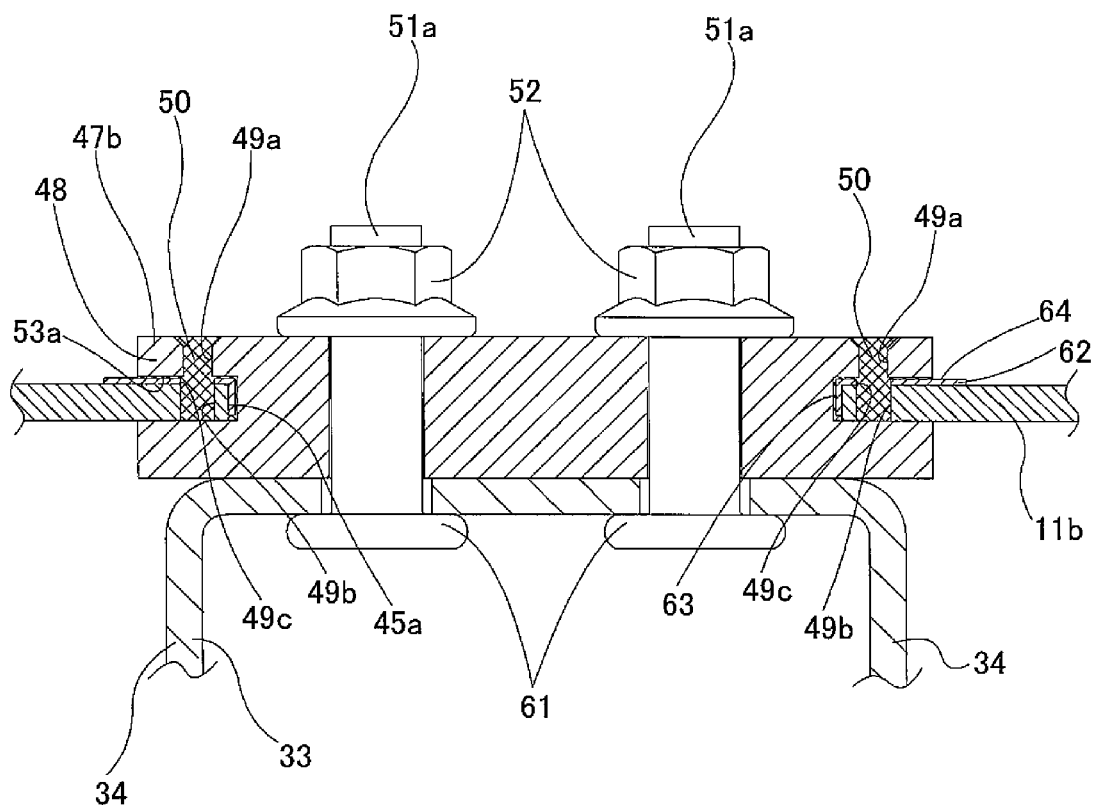
FIG. 21 is a drawing similar to FIG. 19, and illustrates a second example of the third embodiment of the present invention.

FIG. 21 illustrates a second example of the third embodiment of the present invention. In this example, the locking grooves 53a that are formed on both the left and right sides and the rear side of the locking capsule 47b and the edge portion around the locking hole 45a of the bracket 11b on the vehicle side engage. In other words, this example uses a locking capsule that corresponds to the locking capsule 47a in the construction of the first embodiment illustrated in FIG. 5. However, taking into consideration the placement of the sliding plate 62, the dimensions of the locking groove 53a are similar to but a little smaller than the dimensions of the locking hole 45a. More specifically, the width dimension of the locking hole 45a is larger than the width dimension of the locked section (middle section in the up/down direction) where the locking groove 53a of the locking capsule 47b is formed, and 2 times the thickness dimension of the hanging plate section 63 of the sliding plate 62 or greater. The construction and functions of the other parts are the same as in the first example of the third embodiment.

Third Example of Third Embodiment

Figure 22:
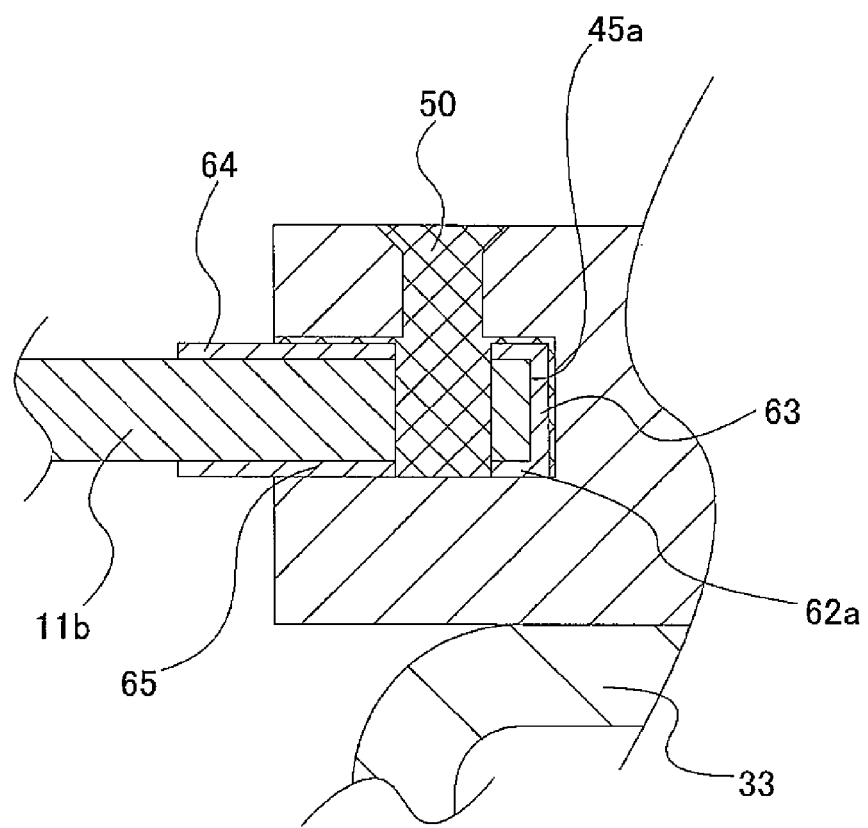
FIG. 22 is a partial cross-sectional view illustrating a third example of the third embodiment of the present invention, and corresponds to the left end section in FIG. 21.

FIG. 22 illustrates a third example of the third embodiment of the present invention. In this example, the cross-sectional shape of the sliding plate 62a is U shaped. In other words, the bottom plate section 65 is bent from the edge of the bottom end of the hanging plate section 63 of the sliding plate 62 in the same direction as the installation plate section 64. The portion of the bracket 11b on the vehicle side that surrounds the locking hole 45a is held between the top surface of the bottom plate section 65 and the bottom surface of the installation plate section 64. The construction and functions of the other parts are the same as in the section example of the third embodiment.

Fourth Example of Third Embodiment

Figure 23:
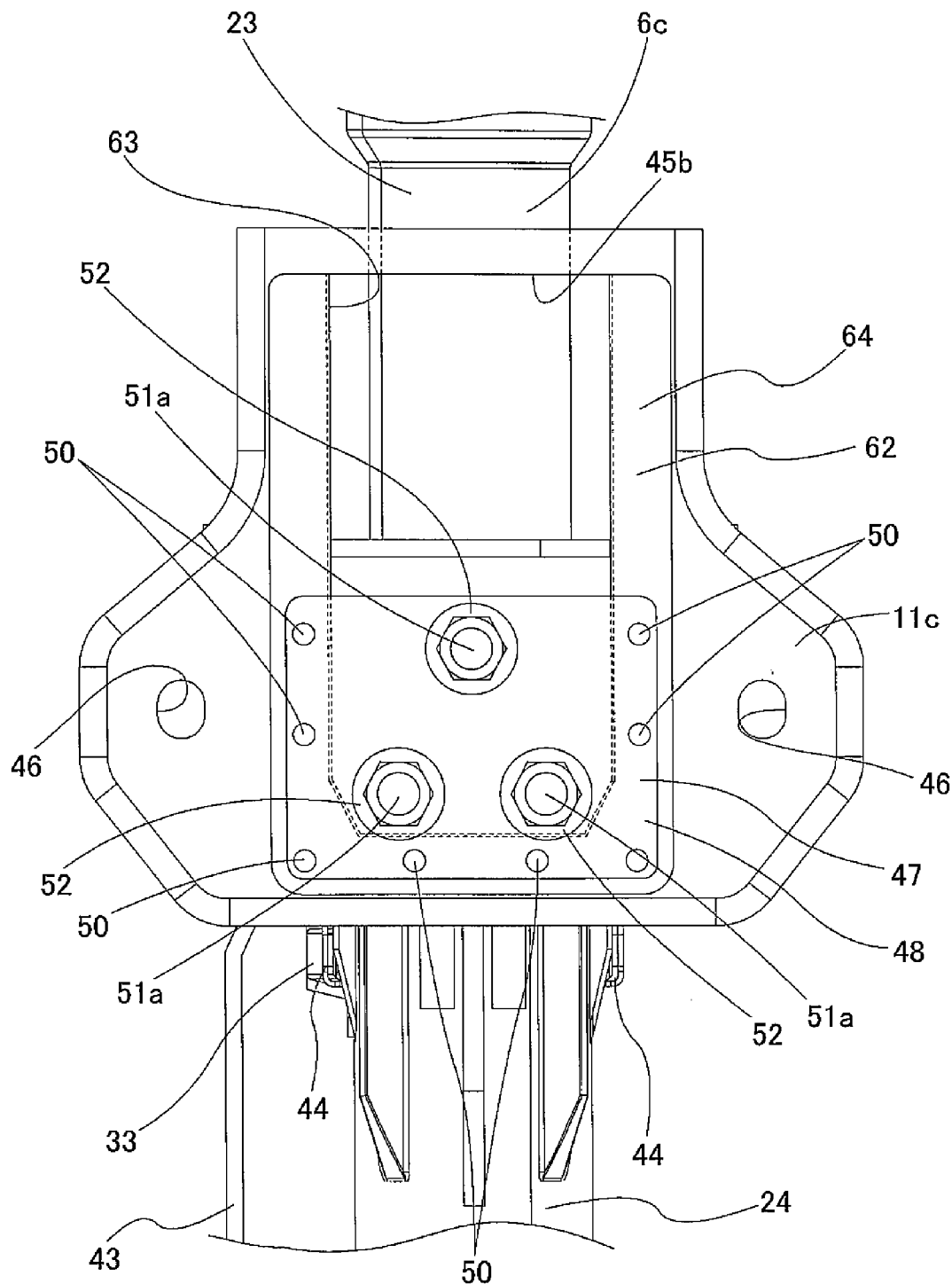
FIG. 23 is a drawing similar to FIG. 18, and illustrates a fourth example of the third embodiment of the present invention.

FIG. 23 illustrates a fourth example of the third embodiment of the present invention. In the case of this example, the locking hole 45b that is formed in the bracket 11c on the vehicle side is a through hole that is not open on the front edge side of the bracket 11c on the vehicle side. The length dimension of this through hole 45b in the forward/backward direction of the bracket 11c on the vehicle side is sufficiently larger than the length dimension of the locking capsule 47. During a secondary collision, the locking hole 47 is able to displace in the forward direction inside the locking hole 45b within a range where the surface on the front end of the locking capsule 47 does not come in contact with the inner edge on the front end of the locking hole 45b. The construction and functions of the other parts are the same as in the first example of the third embodiment.

Fifth Example of Third Embodiment

Figure 24:
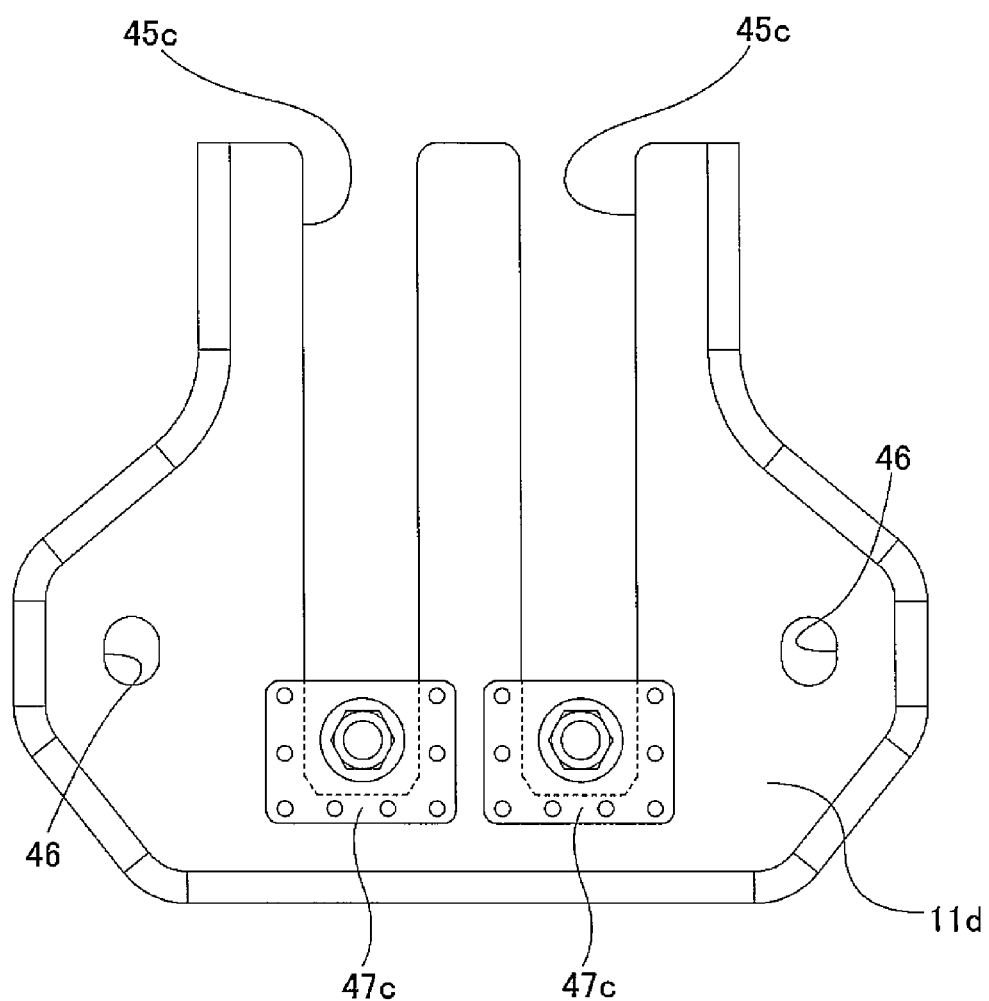
FIG. 24 is a partial top view illustrating a fifth example of the third embodiment of the present invention, and corresponds to the top side section in FIG. 18.

FIG. 24 illustrates a fifth example of the third embodiment of the present invention. In this example, a locking hole (locking notch) 45c is formed in the center section in the width direction of the bracket on the vehicle side, and the aspect of the bracket 11d on the vehicle side and the locking capsule 47 engaging in the center section in the width direction of the bracket 11d on the vehicle side is common with the other embodiments. However, in this example, a pair of parallel open locking holes (locking notches) 45c that open on the edge of the front end of the bracket 11d on the vehicle side are formed in the bracket 11d on the vehicle side, and a pair of locking capsules 47c are locked in these locking holes 45c. The construction and functions of the other parts are the same as in the first example of the third embodiment.

Embodiment 4

FIGS. 27A to 27E illustrate five examples for reducing the break away load as a fourth embodiment of the present invention. In other words, in order to lessen the impact that is applied to the body of the driver during a secondary collision, it is necessary to keep the break away load, which is the load applied to the bracket on the column side the instant that the bracket on the column side begins to displace in the forward direction with respect to the bracket on the vehicle side, low. In order to accomplish this, making the friction state of the engagement section between the locking capsule, which is fastened to the bracket on the column side, and the bracket on the vehicle side a dynamic friction state rather than a static friction state is effective.

Figure 25:
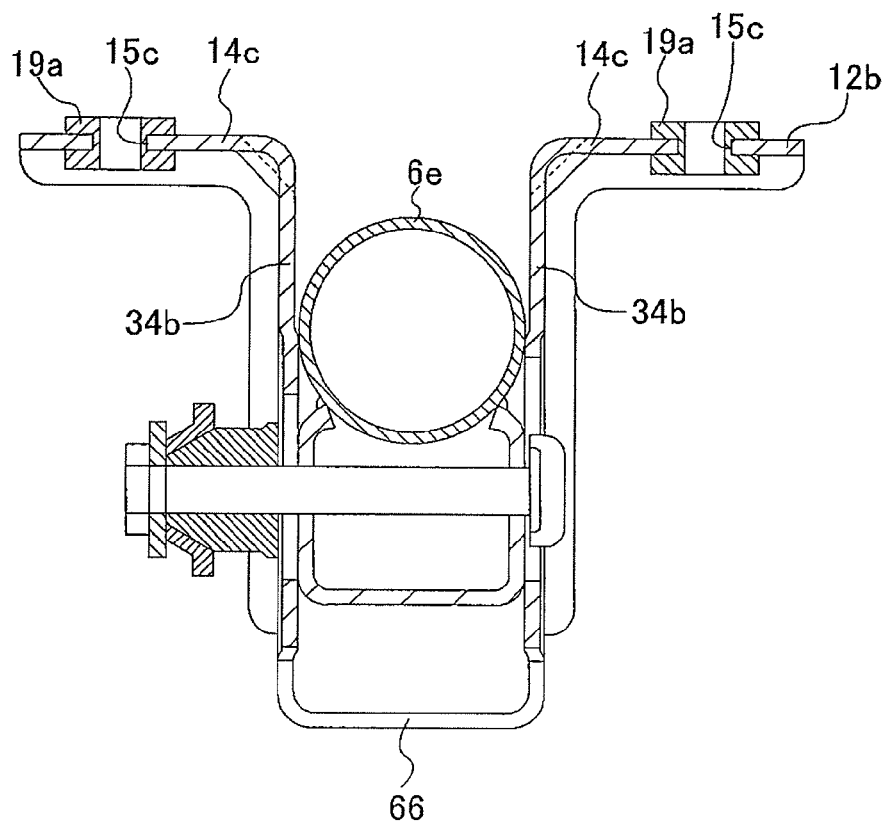
FIG. 25 is a cross-sectional view of section f-f in FIG. 31, and illustrates an example of construction that considers reducing the break away load.

First, the effect of making the friction state at the engagement section between the locking capsule and the bracket on the vehicle side a dynamic friction state rather than a static friction state will be explained in reference to the construction illustrated in FIG. 25 and FIG. 26 wherein the bracket on the column side is supported by the bracket on the vehicle side at two locations on both end sections in the width direction. In this construction, the steering column 6e is supported by the center section in the width direction of the bracket 12b on the vehicle side, and locking capsules 19a are locked in cutout sections 15c that are formed in a pair of installation plate sections 14c that are formed by bending from the top end sections of the bracket 12b on the column side in opposite directions from each other. The bottom end sections of a pair of left and right support plate sections 34b of the bracket 12b on the column side are connected by way of connecting section 66 having low rigidity.

Figure 26:
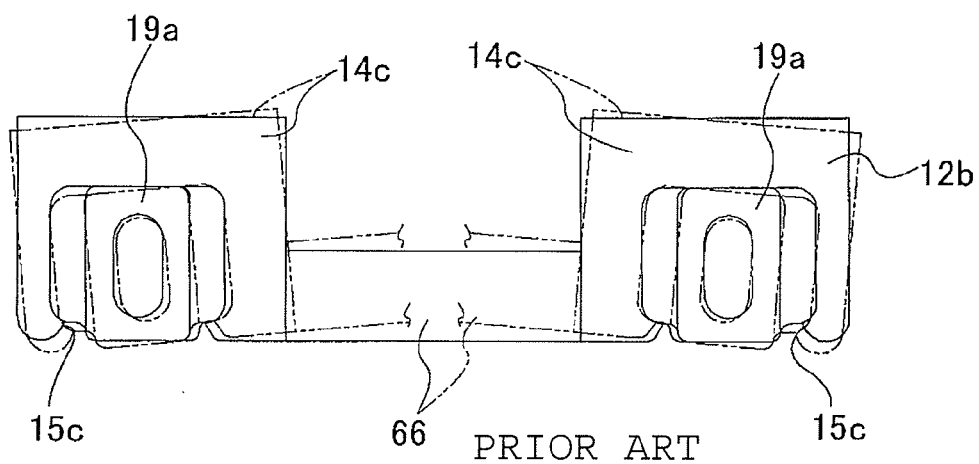
FIG. 26 is a top view of only the bracket on the column side that has been removed, and illustrates the state in FIG. 25 as seen from above.

When an impact load is applied in the forward direction from the steering column 6e to the support plate sections 34b, the connecting section 66 and the installation plate sections 14c displace from the state illustrated by the solid line in FIG. 26 to the state illustrated by the dash line. As a result, the areas of contact between the installation plate sections 14c and the locking capsules 19a displace a little, and the friction states of these areas of contact change from a static friction state to a dynamic friction state. At the instant that these areas of contact change to a dynamic friction state, the locking capsules 19a come out from the cutout sections 15c. As is well known, the dynamic friction coefficient is smaller than the static friction coefficient, so it is possible to keep the force required for the locking capsules 19a to come out low, or in other words, it is possible to keep the break away load of the bracket 12b on the column side low.

This fourth embodiment of the present invention combines and applies construction for changing the friction state of the engagement section between the locking capsule, which is fastened to the bracket on the column side, and the bracket on the vehicle side from a static friction state to a dynamic friction state with the other embodiments of the present invention. More specifically, by alternatively applying the locking capsule or bracket on the vehicle side having the construction described below to the construction of the other embodiments, it is possible to additionally obtain the effect of the fourth embodiment.

Figure 27:
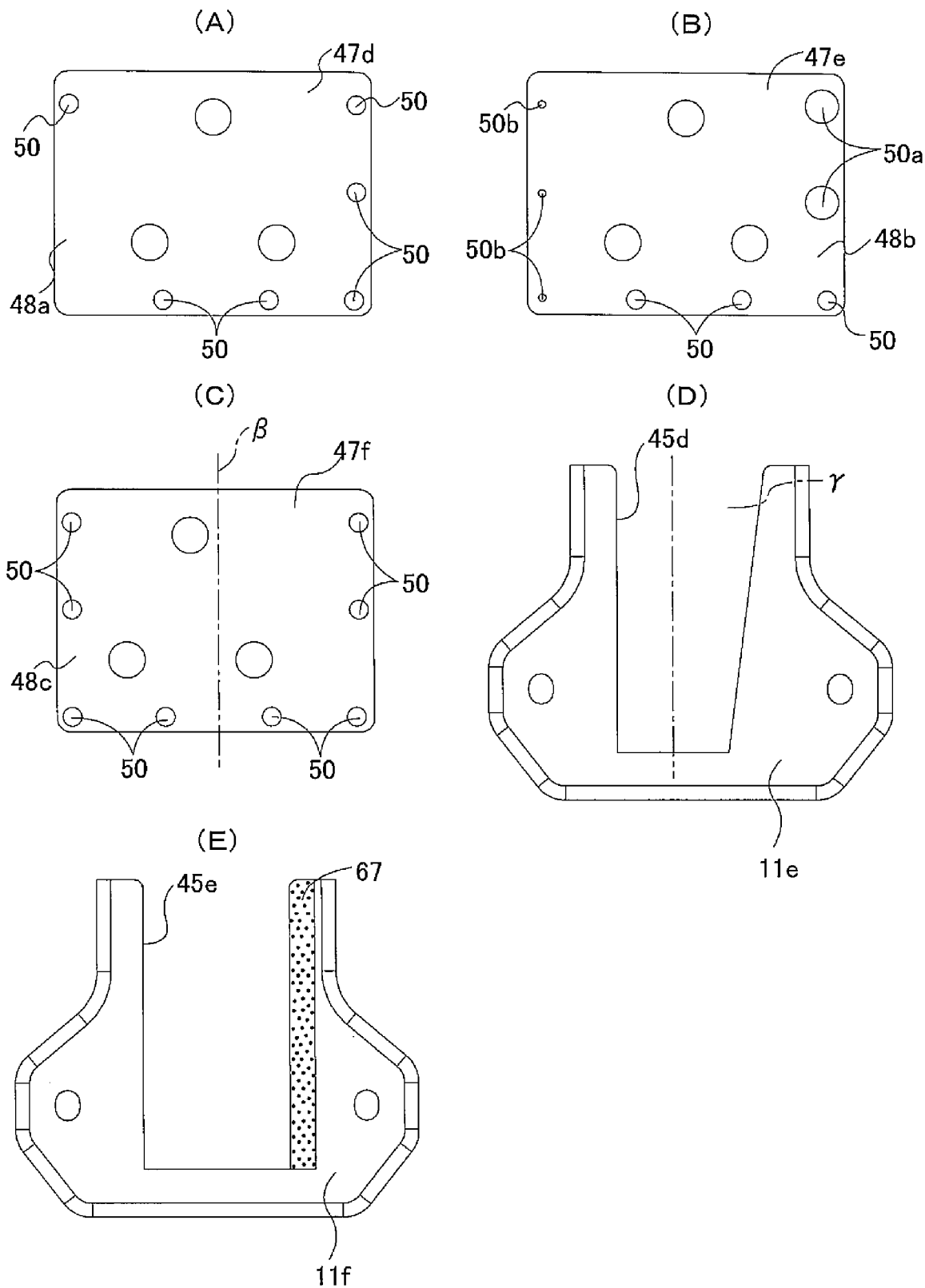
FIGS. 27A to 27E illustrate five examples of construction in a fourth embodiment of the present invention for reducing the break away load, where

First, in the case of the construction illustrated in FIGS. 27A and 27B, the flange section 48a, 48b of the locking capsule 47d, 47e and the bracket on the vehicle side are connected by a plurality of connecting pins 50, 50a, 50b that shear due to an impact load that is applied during a secondary collision. The strength of the connection against this impact load between the locking capsule 47d, 47e and the bracket on the vehicle side that are connected by these connecting pins 50, 50a, 50b is asymmetric on the left and right side of the steering column. For example, in the case of the construction illustrated in FIG. 27A the number of connecting pins 50 on the left and right differs. On the other hand, in the case of the construction illustrated in FIG. 27B, the diameteres of the connecting pins 50a, 50b on the left and right differ from each other.

In the case of the construction illustrated in FIG. 27C, the position where the bracket on the column side is connected and fastened to the locking capsule 47f is shifted from the center section in the width direction of the locking capsule 47f illustrated by the dot-dash line β in either direction in the width direction, and in this example, is shifted to the left side of the position in FIG. 27C.

On the other hand, in the case of the construction illustrated in FIG. 27D, one of the inside edges of the left and right inside edges of the locking hole 45d of the bracket 11e on the vehicle side, or in other words, the inside edge on the left side in FIG. 27D, is parallel with the center axis of the steering column that is expressed by the dot-dash line y, and the other inside edge, or in other words, the inside edge on the right side in FIG. 27D, is inclined in a direction going away from the one inside edge. Furthermore, in the case of the construction illustrated in FIG. 27E, of the portion of the top surface of the bracket 11f on the vehicle side that comes in contact with the bottom surface of the flange section of the locking capsule, a sliding layer 67 made of a low-friction material is provided on only the portion of one side in the width direction of the locking hole 45e.

In the case of the construction of the five examples illustrated in FIGS. 27A to 27E, the bracket on the column side and the locking capsule displace in a twisting direction with respect to the bracket on the vehicle side, or in other words, in a rotating direction around a virtual center axis that is perpendicular to the contact surface. More specifically, a force in a twisting direction as described above is applied at the instant a secondary collision occurs due to the difference in how easy the left and right connecting pins 50, 50a 50b shear in the case of the construction illustrated in FIGS. 27A and 27B, due to the impact load applied to the locking capsule being unbalanced on the left and right in the case of the construction illustrated in FIG. 27C, and due to the difference in the friction force that acts between the edges on both the left and right sides of the locking capsule and the inside edges on the left and right of the locking hole in the case of the construction illustrated in FIGS. 27D and 27E.

In the construction of the other embodiments of the present invention, for example, the displacement due to this kind of force in a twisting direction can be started with a small force when compared with the break away load required to cause the locking capsule to break away with respect to the bracket on the vehicle side. The friction force that acts at the area of contact between the bracket on the vehicle side and the locking capsule (and bracket on the column side) changes from a static friction force to a dynamic friction force due to this displacement. As a result, it is possible to keep the break away force low. In this way, the fourth embodiment of the present invention can additionally be applied to the other embodiments of the present invention.

Embodiment 51

Figure 28:
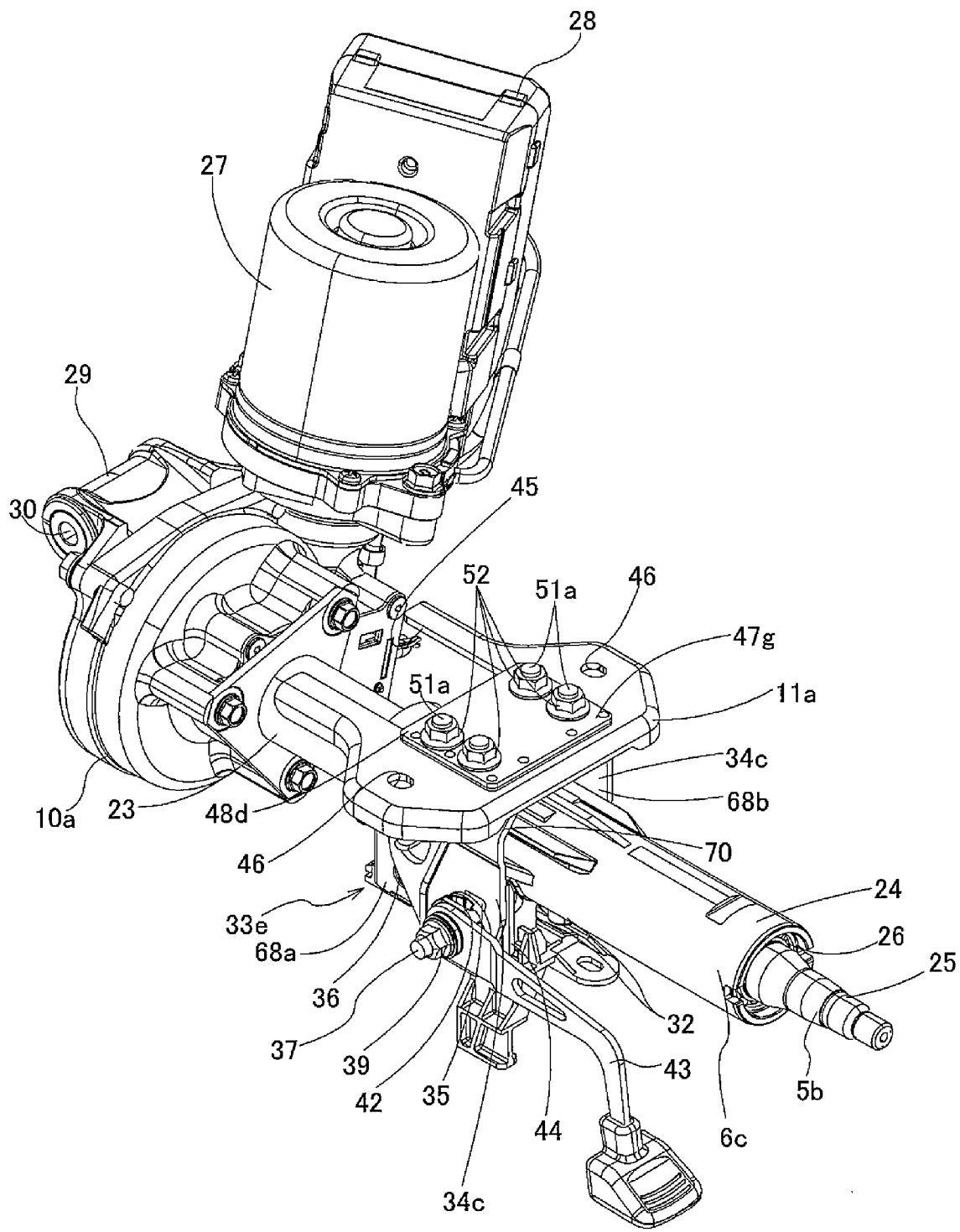
FIG. 28 is a perspective view illustrating an example of a fifth embodiment of the present invention, and illustrates the state as seen from the upper rear.
Figure 29:
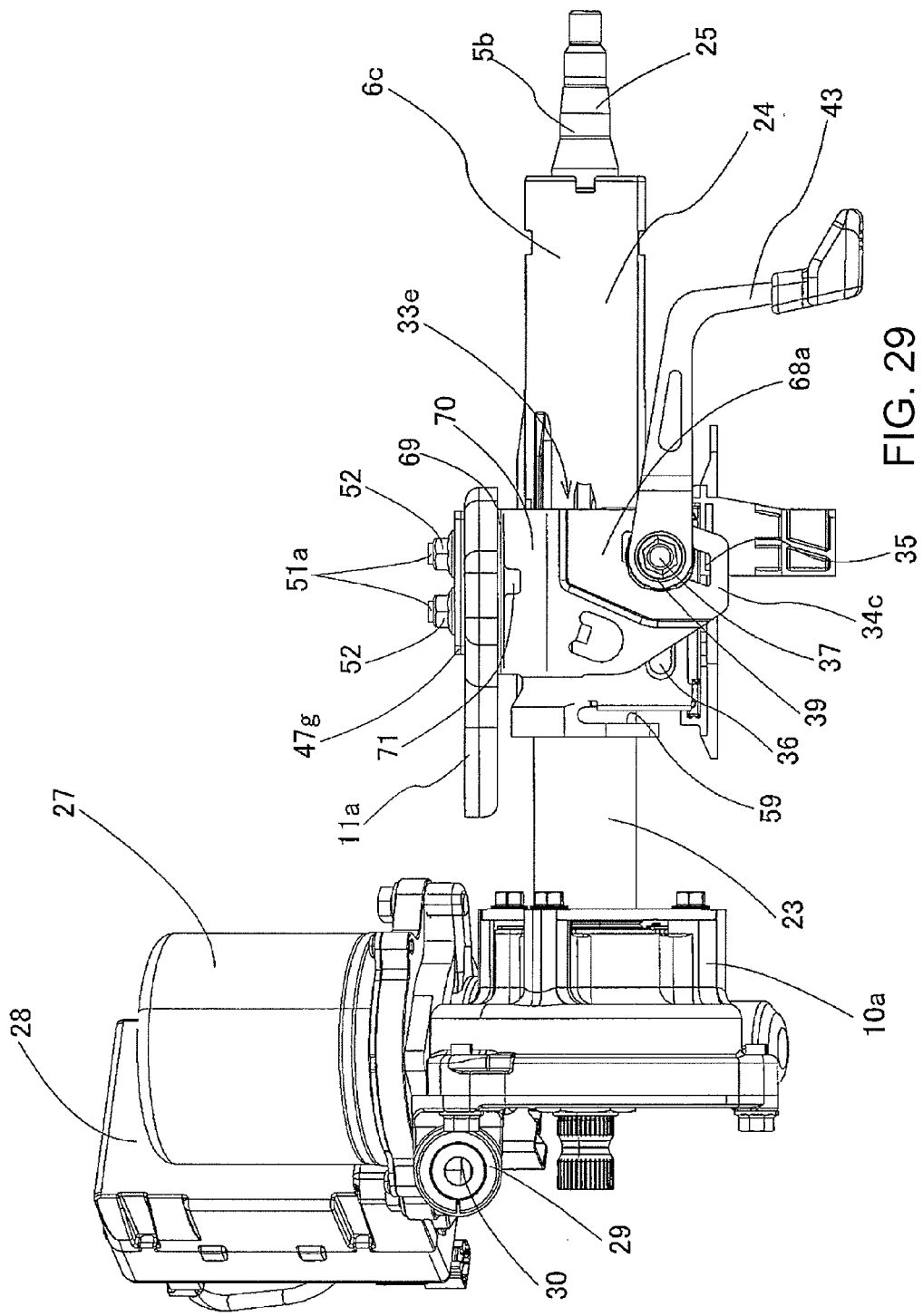
FIG. 29 is a side view illustrating the state in FIG. 28 as seen from the side.
Figure 30:
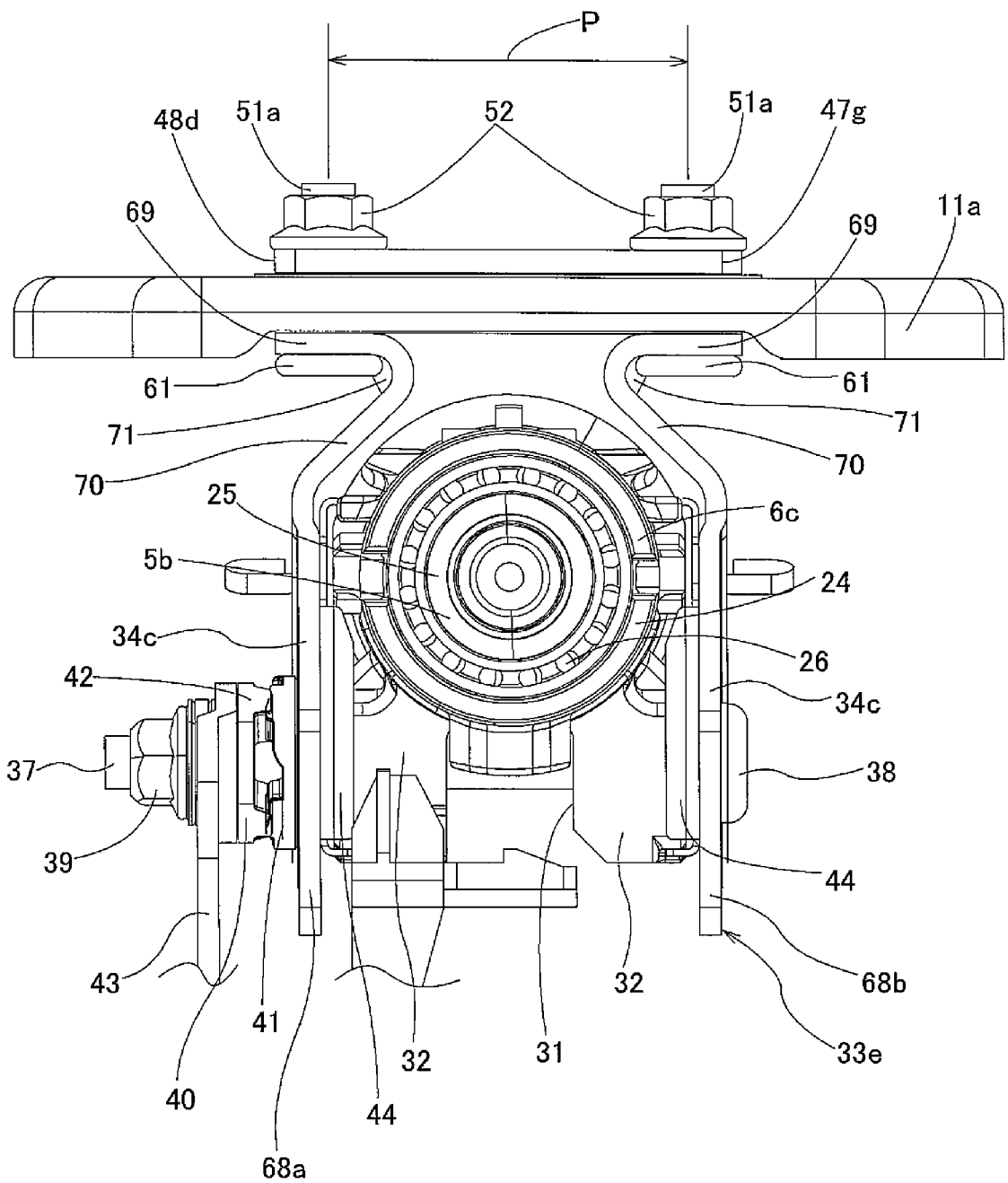
FIG. 30 is an end view of the state in FIG. 28 as seen from the right.

FIG. 28 to FIG. 30 illustrate an example of a fifth embodiment of the present invention. The feature of this embodiment is improving the operational feeling of the driver during normal operation by improving the moment rigidity of the connecting section between the bracket 33e on the column side and the locking capsule 47g by devising the construction of the bracket 33e on the column side. By alternating the construction of the bracket on the column side of this fifth embodiment in the other embodiments of the present invention, it is possible to additionally obtain the effect of this embodiment. The construction and functions of other parts are the same as in the first through third embodiments.

In the construction of the present invention, when the locking capsule 47 and the bracket 33 on the column side having the construction described above are connected and fastened by bolts 51, 51a and nuts 52, or by rivets 54, there is a possibility that design freedom for increasing the pitch of these bolts 51, 51a or rivets 54 is limited. In other words, not only is the pitch between bolts 51, 51a limited from the aspect of the ability to insert this rod shaped members on the inside of the locking hole 45 that is formed in the bracket 11a on the vehicle side, but is also limited from the aspect of preventing interference between the head sections of these members and the end sections of the support plate sections 34 of the bracket 33 on the column side. The space between the inside surfaces of these support plate sections 34 is also restricted by the portions fastened to the steering column that is held between these support plate sections 34, or more specifically by the space between the outside surfaces of the supported plate sections 32.

Even when it is possible to increase the pitch between the rod shaped sections of the bolts 51, 51a or rivets 54 that are located on both the left and right sides by increasing the width dimension of the locking hole 45 by a certain extent, there are cases where the pitch still cannot be increased from the aspect of preventing interference between the head sections and the support plate sections 34. Not being able to increase the pitch between these members is disadvantageous from the aspect of increasing the moment rigidity in the left and right width direction. When this rigidity is low, it becomes easy for the bracket 33 on the column side to vibrate when travelling over a bad road. As a result, the steering wheel 1 that is supported by the bracket 33 on the column side by way of the steering column 6c and the steering shaft 5b vibrates, giving an uncomfortable feeling to the driver who operates the steering wheel 1.

In the following, an example of the fifth embodiment, which is a preferred embodiment for improving this point, will be explained centering on the feature of this embodiment. In the steering column support apparatus of this example, the bracket 33a on the column side is formed by combining a pair of bracket elements 68a, 68b that are separate from each other. These bracket elements 68a, 68b, except for small differences such as the length dimensions of the long holes 35 in the up/down direction, have mirror symmetry, and each is made by bending metal plate, such as carbon steel plate, which has sufficient strength and rigidity. Each of these bracket elements 68a, 68b comprises an installation plate section 69, an inclined plate section 70 and a support plate section 34c. The installation plate sections 69 are formed at the top end sections, and are flat plates for coming in contact with the bottom surface on both end sections of the locking capsule 47g such that there is no movement between surfaces. The inclined plate sections 70 are formed by bending from the inside edges of the installation plate sections 69 (edges of the center side in the width direction that face each other) toward the outside in the width direction (opposite sides from each other) to an angle of more than 90 degrees, for example about 120 to 140 degrees so that the crossing angles with the installation plate sections 69 become acute angles of 40 to 60 degrees, such that they are inclined downward in a direction toward the outside in the width direction. Furthermore, the support plate sections 34c are formed so as to hang down from the edges on the bottom ends of the inclined plate sections 70. In the middle section in the forward/backward direction of the connecting section between the installation plate sections 69 and the inclined plate section 70, in a portion that does not interfere with the bolts 51a, reinforcement ribs 71 are formed in order to maintain the bending rigidity between the installation plate sections 69 and the inclined plate sections 70.

The bracket elements 68a, 68b, each having an installation plate section 69, inclined plate section 70 and support plate section 34c as described above, are arranged such that the support plate sections 34c are parallel with each other, and are connected and fastened to the locking capsule 47g at a total of four locations, two locations each in the forward/backward direction of the installation plate sections 69, by bolts 51a and nuts 52, which are rod shaped connecting members. In this state, the support plate sections 34c become the portions that hold and support, from both the left and right sides, a pair of supported plate sections 32, which are formed on the bottom section of the outer column 24, which forms the rear end section of the steering column 6c. In order to prevent interference with the inclined plate sections 70, bolts having a short dimension in the axial direction, and that have a circular plate shape head section 61 are used as the bolts 51a. Furthermore, by using rivets 54 instead of the bolts 51a and nuts 52, it is possible to even further reduce the height dimension of the connecting section with these bracket elements 68a, 68b.

In the steering column support apparatus of this example, the moment rigidity of the connecting section between the locking capsule 47g and the bracket 33e on the column side that is a combination of bracket elements 68a, 68b is increased, and thus it is possible to improve the operational feeling of the steering wheel 1. In other words, in this example, the bolts 51a are arranged on the outsides of the inclined plate sections 70 (sides opposite from each other) of the bracket elements 68a, 68b. Moreover, the height dimension of each of the head sections 61 of the bolts 51a is reduced, and these head sections 61 extend to the back of the sections between the installation plate sections 69 and the inclined plate sections 70.

By employing this kind of construction, in this example, it is possible to suitably arrange the bolts 51a for connecting and fastening the locking capsule 47g and bracket 33e on the column side. In other words, it is possible to increase the pitch in the width direction on the left and right of these bolts 51a, and thus increase the moment rigidity in the left and right width direction of the connecting section between the locking capsule 47g and the bracket 33e on the column side. Moreover, by devising the shape of the head sections 61, it is possible to arrange the bolts 51a in positions directly above the support plate sections 34c even though the crossing angles between the installation plate sections 69 and the inclined plate sections 70 are acute angles. Therefore, with the proper value for the width of the locking hole 45 that is formed in the bracket 11a on the vehicle side being maintained without the pitch P in the left and right width direction of these bolts becoming excessive, it is possible to properly arrange the bolts 51a. In other words, when attempting to increase the pitch P in order to increase the moment rigidity of the connecting section between the locking capsule 47g and the bracket 33e on the column side, the size of the locking hole 45 does not have to be increased more than necessary, so performing design using the optimal values for the dimensional relationships of each of the parts becomes easier.

In the case of the steering column support apparatus of this example, with the dimensions of each part maintained at the optimal values, sufficient pitch P in the left and right width direction of the bolts 51a that connect the locking capsule 47g and the bracket 33e on the vehicle side is achieved, so it possible to sufficiently increase the moment rigidity of the connecting section between the locking capsule 47g and the bracket 33e on the column side. Therefore, it is possible to increase the natural frequency (resonant frequency) of the steering column 6c that is supported by the bracket 33e on the column side even when travelling over bad roads, so it becomes difficult for the steering wheel 1, which is supported by the steering column 6c by way of the steering shaft 5b, to vibrate, and thus it is possible to avoid giving an uncomfortable feeling to the driver who operates the steering wheel 1.

INDUSTRIAL APPLICABILITY

The case of applying the present invention to a steering column support apparatus that comprises both a tilt mechanism for adjusting the up/down position of a steering wheel, and a telescopic mechanism for similarly adjusting the forward/backward position of the steering wheel was explained. However, the present invention can also be applied to a steering column support apparatus that comprises only a tilt mechanism or only a telescopic mechanism, and can be applied to a fixed steering wheel type steering column support apparatus that does not comprise either of these mechanisms.

| [Explanation of Reference Numbers] | |
| --- | --- |
| 1 | Steering wheel |
| 2 | Steering gear unit |
| 3 | Input shaft |
| 4 | Tie rod |
| 5, 5a, 5b | Steering shaft |
| 6, 6a, 6b, 6c, 6d, 6e | Steering column |
| 7 | Universal joint |
| 8 | Intermediate shaft |
| 9 | Universal joint |
| 10, 10a | Housing |
| 11, 11a, 11b, 11c, 11d, 11e, 11f | Bracket on the vehicle side |
| 12, 12a, 12b | Bracket on the column side |
| 13 | Bracket on the housing side |
| 14a, 14b, 14c | Installation plate section |
| 15a, 15b, 15c | Cutout section |
| 16a, 16b | Sliding plate |
| 17 | Energy absorbing member |
| 18 | Locking notch |
| 19, 19a | Locking capsule |
| 20, 20a | Locking groove |
| 21a, 21b | Small locking hole |
| 22 | Locking pin |
| 23 | Inner column |
| 24, 24a | Outer column |
| 25 | Outer shaft |
| 26 | Ball bearing |
| 27 | Electric motor |
| 28 | Controller |
| 29 | Support cylinder |
| 30 | Center hole |
| 31 | Slit |
| 32 | Supported plate section |
| 33, 33a, 33b, 33c, 33d, 33e | Bracket on the column side |
| 34, 34a, 34b, 34c | Support plate section |
| 35 | Long hole in the up/down direction |
| 36 | Long hole in the forward/backward direction |
| 37 | Adjustment rod |
| 38 | Head section |
| 39 | Nut |
| 40 | Driving cam |
| 41 | Driven cam |

[Explanation of Reference Numbers]

| | |
|---|---|
| 42 | Cam apparatus |
| 43 | Adjustment lever |
| 44 | Friction plate unit |
| 45, 45a, 45b, 45c, 45d, 45e | Locking hole (locking notch) |
| 46 | Installation hole |
| 47, 47a, 47b, 47c, 47d, 47e, 47f, 47g | Locking capsule |
| 48, 48a, 48b, 48c, 48d | Flange section |
| 49a, 49b, 49c | Small through hole on the capsule side |
| 50, 50a, 50b | Locking pin |
| 51 | Bolt |
| 52 | Nut |
| 53, 53a | Locking groove |
| 54 | Rivet |
| 55, 55a, 55b, 55c, 55d | Top plate section |
| 56 | Bottom plate section |
| 57, 57a | Extending section |
| 58, 58a | Convex curved surface |
| 59 | Through hole in the circumferential direction |
| 60 | Protruding piece |
| 61 | Head section |
| 62, 62a | Sliding plate |
| 63 | Hanging plate section |
| 64 | Installation plate section |
| 65 | Bottom plate section |
| 66 | Connecting section |
| 67 | Sliding layer |
| 68a, 68b | Bracket element |
| 69 | Installation plate section |
| 70 | Inclined plate section |
| 71 | Rib |

What is claimed is:

1. A steering column support apparatus, comprising:
a bracket on the vehicle side having a locking hole that extends in the axial direction of a steering column and that is located in the center section in the width direction of the bracket, this bracket on the vehicle side being supported by and fastened to the vehicle so as not to displace in the forward direction during a secondary collision;
a bracket on the column side that is supported by the steering column; and
a locking capsule that is fastened to the bracket on the column side, and in this fastened state, comprises a locked section, both end sections thereof being locked inside the locking hole, and a top side section that is formed on the top side of the locked section and having a width dimension that is greater than the maximum width dimension of the locking hole, and that in fastened state, is located on the portion of the top side of the bracket on the vehicle side on both sides of the locking hole,
by combining the locking capsule and the bracket on the vehicle side when the portion of the bracket on the vehicle side on both sides of the locking hole is held between the bottom surface of a flange section of the locking capsule and the top surface of an underneath support plate that is located below the flange section, the bracket on the column side being supported by the bracket on the vehicle side so as to be able to break away in the forward direction due to an impact load that is applied during a secondary collision, and
means for suppressing a rise in contact pressure being further provided, this means suppressing a rise in contact pressure that increases at the area of contact between the front edge of the top surface of the underneath support plate and the bottom surface of the bracket on the vehicle side, when the front edge of the top surface of the underneath support plate is pressed against the bottom surface of the bracket on the vehicle side due to a moment that is applied from the steering column to the bracket on the column side during a secondary collision.

2. The steering column support apparatus according to claim 1, wherein the bracket on the column side comprises a top plate section that has a width dimension that is greater than the width dimension of the locked section of the locking capsule, and that is provided with the underneath support plate section that is located below the flange section of the locking capsule; and together with the bottom surface of the locked section of the locking capsule coming in contact with the top surface of the top plate section of the bracket on the column side, the portion of the bracket on the vehicle side on both sides of the locking hole is held between the bottom surface of the flange section and the top surface of the top plate section.

3. The steering column support apparatus according to claim 1, wherein the means for suppressing a rise in contact pressure is: an inclined surface that is formed on the portion near the front end on the top surface of the underneath support plate and is inclined in a direction downward going toward the front edge of the underneath support plate section, or an extending section that is formed on the front end section of the underneath support plate section and protrudes further toward the front than the edge on the front end of the flange section.

4. The steering column support apparatus according to claim 3, wherein the means for suppressing a rise in the contact pressure is comprised of the extending section, the extending section provided with an inclined surface that is formed on the portion near the front end on the top surface of the extending section and is inclined in a direction downward going toward the edge on the front edge of the extending section.

5. The steering column support apparatus according to claim 1, wherein a low-friction material layer made of a material that is different from the metal of the underneath support plate and bracket on the vehicle side, is provided at the area of contact between the top surface of the underneath support plate and the bottom surface of the bracket on the vehicle side so as to reduce the coefficient of friction at the area of contact.

6. The steering column support apparatus according to claim 1, wherein the length in the forward/backward direction of the locking hole is longer than the length in the same direction of the locking capsule, and is long enough that even when the locking capsule has displaced in the forward direction, at least part of the locking capsule is located on the top side of the front end section of the bracket on the vehicle side, making it possible to prevent the locking capsule from dropping down.

* * * * *